US011590997B1

(12) United States Patent
Bhaskaran et al.

(10) Patent No.: US 11,590,997 B1
(45) Date of Patent: Feb. 28, 2023

(54) AUTONOMOUS SHOPPING CART

(71) Applicant: Staples, Inc., Framingham, MA (US)

(72) Inventors: Michael Bhaskaran, Sherborn, MA (US); Weston Harris, Allston, MA (US); Maimuna Rangwala, North Grafton, MA (US)

(73) Assignee: Staples, Inc., Framingham, MA (US)

( * ) Notice: Subject to any disclaimer, the term of this patent is extended or adjusted under 35 U.S.C. 154(b) by 722 days.

(21) Appl. No.: 16/534,957

(22) Filed: Aug. 7, 2019

Related U.S. Application Data

(60) Provisional application No. 62/715,759, filed on Aug. 7, 2018.

(51) Int. Cl.
*B62B 5/00* (2006.01)
*G06Q 30/0601* (2023.01)
(Continued)

(52) U.S. Cl.
CPC .......... *B62B 5/0069* (2013.01); *B62B 3/1424* (2013.01); *B62B 5/0033* (2013.01); *B62B 5/0096* (2013.01); *G06Q 30/0623* (2013.01); *G06Q 30/0635* (2013.01); *G06Q 30/0641* (2013.01); *G06K 7/1413* (2013.01); *G06K 7/1417* (2013.01)

(58) Field of Classification Search
CPC ..... B62B 5/0033; B62B 5/004; B62B 5/0069; B62B 5/0096; B62B 3/14; B62B 3/027; B62B 3/1424; G06Q 30/0641; G06K 7/1417
USPC ............................................ 235/383, 462.13
See application file for complete search history.

(56) References Cited

U.S. PATENT DOCUMENTS 3,450,276 A 6/1969 Ferrari
3,474,877 A 10/1969 Wesener
(Continued)

FOREIGN PATENT DOCUMENTS

CA 1196712 A 11/1985
CA 1210367 A 8/1986
(Continued)

OTHER PUBLICATIONS

US 7,460,017 B2, 12/2008, Roeder et al. (withdrawn)
(Continued)

*Primary Examiner* — Paultep Savusdiphol
(74) *Attorney, Agent, or Firm* — VLP Law Group LLP; Michel Bohn

(57) ABSTRACT

In an example implementation, a smart cart system may include a cart including a frame and an item holder supported by the frame and configured to transition between an open position and a storage position that is more compact than the open position. The smart cart system may include a motivator configured to provide a motive force to the cart, a power source coupled with the motivator, and a charging interface attached to the frame of the cart and that interacts with a cart charging system of a cart storage rack to charge the power source. The smart cart system may also include a user interface device, a computing device, and a smart cart controller operable on the computing device to receive information describing an attribute of an item and provide information describing the attribute of the item for presentation by the user interface device.

20 Claims, 30 Drawing Sheets

(51) Int. Cl.
  *B62B 3/14*     (2006.01)
  *G06K 7/14*     (2006.01)

(56)            References Cited

U.S. PATENT DOCUMENTS

| | | |
|---|---|---|
| 3,628,624 A | 12/1971 | Wesener |
| 3,970,840 A | 7/1976 | De Bruine |
| 4,010,409 A | 3/1977 | Waites |
| 4,215,759 A | 8/1980 | Diaz |
| 4,258,813 A | 3/1981 | Rubel |
| 4,278,142 A | 7/1981 | Kono |
| 4,465,155 A | 8/1984 | Collins |
| 4,496,274 A | 1/1985 | Pipes |
| 4,524,314 A | 6/1985 | Walker |
| 4,530,056 A | 7/1985 | MacKinnon et al. |
| 4,556,940 A | 12/1985 | Katoo et al. |
| 4,562,635 A | 1/1986 | Carter |
| 4,566,032 A | 1/1986 | Hirooka et al. |
| 4,593,238 A | 6/1986 | Yamamoto |
| 4,593,239 A | 6/1986 | Yamamoto |
| 4,652,803 A | 3/1987 | Kamejima et al. |
| 4,653,002 A | 3/1987 | Barry |
| 4,657,463 A | 4/1987 | Pipes |
| 4,678,390 A | 7/1987 | Bonneton et al. |
| 4,700,302 A | 10/1987 | Arakawa et al. |
| 4,711,316 A | 12/1987 | Katou et al. |
| 4,714,399 A | 12/1987 | Olson |
| 4,716,530 A | 12/1987 | Ogawa et al. |
| 4,727,492 A | 2/1988 | Reeve et al. |
| 4,742,283 A | 5/1988 | Bolger et al. |
| 4,751,983 A | 6/1988 | Leskovec et al. |
| 4,764,078 A | 8/1988 | Neri |
| 4,772,832 A | 9/1988 | Okazaki et al. |
| 4,773,018 A | 9/1988 | Lundstroem |
| 4,777,601 A | 10/1988 | Boegli |
| 4,780,817 A | 10/1988 | Lofgren |
| 4,790,402 A | 12/1988 | Field et al. |
| 4,802,096 A | 1/1989 | Hainsworth et al. |
| 4,811,227 A | 3/1989 | Wikstroem |
| 4,811,229 A | 3/1989 | Wilson |
| 4,817,000 A | 3/1989 | Eberhardt |
| 4,846,297 A | 7/1989 | Field et al. |
| 4,847,769 A | 7/1989 | Reeve |
| 4,847,773 A | 7/1989 | van Helsdingen et al. |
| 4,847,774 A | 7/1989 | Tomikawa et al. |
| 4,852,677 A | 8/1989 | Okazaki |
| 4,857,912 A | 8/1989 | Everett et al. |
| 4,858,132 A | 8/1989 | Holmquist |
| 4,862,047 A | 8/1989 | Suzuki et al. |
| 4,863,335 A | 9/1989 | Herigstad et al. |
| 4,875,172 A | 10/1989 | Kanayama |
| 4,890,233 A | 12/1989 | Ando et al. |
| 4,918,607 A | 4/1990 | Wible |
| 4,924,153 A | 5/1990 | Toru et al. |
| 4,926,544 A | 5/1990 | Koyanagi et al. |
| 4,935,871 A | 6/1990 | Grohsmeyer |
| 4,939,650 A | 7/1990 | Nishikawa |
| 4,939,651 A | 7/1990 | Onishi |
| 4,942,531 A | 7/1990 | Hainsworth et al. |
| 4,947,324 A | 8/1990 | Kamimura et al. |
| 4,950,118 A | 8/1990 | Mueller et al. |
| 4,954,962 A | 9/1990 | Evans et al. |
| 4,982,329 A | 1/1991 | Tabata et al. |
| 4,990,841 A | 2/1991 | Elder |
| 4,993,507 A | 2/1991 | Ohkura |
| 4,994,970 A | 2/1991 | Noji et al. |
| 4,996,468 A | 2/1991 | Field et al. |
| 5,000,279 A | 3/1991 | Kondo et al. |
| 5,002,145 A | 3/1991 | Wakaumi |
| 5,005,128 A | 4/1991 | Robins et al. |
| 5,006,988 A | 4/1991 | Borenstein et al. |
| 5,020,620 A | 6/1991 | Field |
| 5,023,790 A | 6/1991 | Luke, Jr. |
| 5,040,116 A | 8/1991 | Evans et al. |
| 5,052,882 A | 10/1991 | Blau et al. |
| 5,053,969 A | 10/1991 | Booth |
| 5,073,749 A | 12/1991 | Kanayama |
| 5,109,940 A | 5/1992 | Yardley |
| 5,111,401 A | 5/1992 | Everett et al. |
| 5,125,783 A | 6/1992 | Kawasoe et al. |
| 5,134,353 A | 7/1992 | Kita et al. |
| 5,138,560 A | 8/1992 | Lanfer et al. |
| 5,154,249 A | 10/1992 | Yardley |
| 5,164,648 A | 11/1992 | Kita et al. |
| 5,170,351 A | 12/1992 | Nemoto et al. |
| 5,170,352 A | 12/1992 | McTamaney et al. |
| 5,179,329 A | 1/1993 | Nishikawa et al. |
| 5,187,664 A | 2/1993 | Yardley et al. |
| 5,191,528 A | 3/1993 | Yardley et al. |
| 5,192,903 A | 3/1993 | Kita et al. |
| 5,199,524 A | 4/1993 | Ivancic |
| 5,202,832 A | 4/1993 | Lisy |
| 5,211,523 A | 5/1993 | Andrada et al. |
| 5,213,176 A | 5/1993 | Oroku et al. |
| 5,216,605 A | 6/1993 | Yardley et al. |
| 5,239,249 A | 8/1993 | Ono |
| 5,249,157 A | 9/1993 | Taylor |
| 5,281,901 A | 1/1994 | Yardley et al. |
| 5,305,217 A | 4/1994 | Nakamura et al. |
| 5,341,130 A | 8/1994 | Yardley et al. |
| 5,387,853 A | 2/1995 | Ono |
| 5,488,277 A | 1/1996 | Nishikawa et al. |
| 5,510,984 A | 4/1996 | Markin et al. |
| 5,525,884 A | 6/1996 | Sugiura et al. |
| 5,545,960 A | 8/1996 | Ishikawa |
| 5,548,512 A | 8/1996 | Quraishi |
| 5,564,890 A | 10/1996 | Knudsen, Jr. |
| 5,568,030 A | 10/1996 | Nishikawa et al. |
| 5,586,620 A | 12/1996 | Dammeyer et al. |
| 5,650,703 A | 7/1997 | Yardley et al. |
| 5,669,748 A | 9/1997 | Knudsen, Jr. |
| 5,875,408 A | 2/1999 | Bendett et al. |
| 5,911,767 A | 6/1999 | Garibotto et al. |
| 5,923,270 A | 7/1999 | Sampo et al. |
| 5,961,559 A | 10/1999 | Shimbara et al. |
| 6,049,745 A | 4/2000 | Douglas et al. |
| 6,058,339 A | 5/2000 | Takiguchi et al. |
| 6,092,010 A | 7/2000 | Alofs et al. |
| 6,246,930 B1 | 6/2001 | Hori |
| 6,256,560 B1 | 7/2001 | Kim et al. |
| 6,345,217 B1 | 2/2002 | Zeitler et al. |
| 6,370,452 B1 | 4/2002 | Pfister |
| 6,377,888 B1 | 4/2002 | Olch |
| 6,459,966 B2 | 10/2002 | Nakano et al. |
| 6,477,463 B2 | 11/2002 | Hamilton |
| 6,493,614 B1 | 12/2002 | Jung |
| 6,602,037 B2 | 8/2003 | Winkler |
| 6,615,108 B1 | 9/2003 | Peless et al. |
| 6,629,028 B2 | 9/2003 | Paromtchik et al. |
| 6,654,647 B1 | 11/2003 | Kal |
| 6,721,638 B2 | 4/2004 | Zeitler |
| 6,748,292 B2 | 6/2004 | Mountz |
| 6,772,062 B2 | 8/2004 | Lasky et al. |
| 6,882,910 B2 | 4/2005 | Jeong |
| 6,885,912 B2 | 4/2005 | Peless et al. |
| 6,895,301 B2 | 5/2005 | Mountz |
| 6,904,343 B2 | 6/2005 | Kang |
| 6,950,722 B2 | 9/2005 | Mountz |
| 6,971,464 B2 | 12/2005 | Marino et al. |
| 7,050,891 B2 | 5/2006 | Chen |
| 7,110,855 B2 | 9/2006 | Leishman |
| 7,155,309 B2 | 12/2006 | Peless et al. |
| 7,305,287 B2 | 12/2007 | Park |
| 7,333,631 B2 | 2/2008 | Roh et al. |
| 7,349,759 B2 | 3/2008 | Peless et al. |
| 7,402,018 B2 | 7/2008 | Mountz et al. |
| 7,403,120 B2 | 7/2008 | Duron et al. |
| 7,437,226 B2 | 10/2008 | Roh et al. |
| 7,460,016 B2 | 12/2008 | Sorenson et al. |
| 7,505,849 B2 | 3/2009 | Saarikivi |
| 7,548,166 B2 | 6/2009 | Roeder et al. |
| 7,557,714 B2 | 7/2009 | Roeder et al. |
| 7,609,175 B2 | 10/2009 | Porte et al. |
| 7,613,617 B2 | 11/2009 | Williams et al. |

(56) References Cited

U.S. PATENT DOCUMENTS

| | | |
|---|---|---|
| 7,616,127 B2 | 11/2009 | Sorenson et al. |
| 7,634,332 B2 | 12/2009 | Williams et al. |
| 7,639,142 B2 | 12/2009 | Roeder et al. |
| 7,648,329 B2 | 1/2010 | Chilson et al. |
| 7,656,296 B2 | 2/2010 | Runyon et al. |
| 7,681,796 B2 | 3/2010 | Cato |
| 7,689,001 B2 | 3/2010 | Kim et al. |
| 7,693,757 B2 | 4/2010 | Zimmerman |
| 7,765,027 B2 | 7/2010 | Hong et al. |
| 7,826,919 B2 | 11/2010 | D'Andrea et al. |
| 7,835,821 B2 | 11/2010 | Roh et al. |
| 7,840,328 B2 | 11/2010 | Baginski et al. |
| 7,845,560 B2 | 12/2010 | Emanuel et al. |
| 7,850,413 B2 | 12/2010 | Fontana |
| 7,873,469 B2 | 1/2011 | D'Andrea et al. |
| 7,890,228 B2 | 2/2011 | Redmann et al. |
| 7,894,932 B2 | 2/2011 | Mountz et al. |
| 7,894,933 B2 | 2/2011 | Mountz et al. |
| 7,894,939 B2 | 2/2011 | Zini et al. |
| 7,894,951 B2 | 2/2011 | Norris et al. |
| 7,912,574 B2 | 3/2011 | Wurman et al. |
| 7,912,633 B1 | 3/2011 | Dietsch et al. |
| 7,920,962 B2 | 4/2011 | D'Andrea et al. |
| 7,925,514 B2 | 4/2011 | Williams et al. |
| 7,953,551 B2 | 5/2011 | Park et al. |
| 7,980,808 B2 | 7/2011 | Chilson et al. |
| 7,991,521 B2 | 8/2011 | Stewart |
| 7,996,109 B2 | 8/2011 | Zini et al. |
| 8,010,230 B2 | 8/2011 | Zini et al. |
| 8,020,657 B2 | 9/2011 | Allard et al. |
| 8,031,086 B2 | 10/2011 | Thacher et al. |
| 8,068,978 B2 | 11/2011 | D'Andrea et al. |
| 8,072,309 B2 | 12/2011 | Kraimer et al. |
| 8,075,243 B2 | 12/2011 | Chilson et al. |
| 8,146,702 B2 | 4/2012 | Schendel et al. |
| 8,160,728 B2 | 4/2012 | Curtis |
| 8,170,711 B2 | 5/2012 | D'Andrea et al. |
| 8,192,137 B2 | 6/2012 | Ross et al. |
| 8,193,903 B2 | 6/2012 | Kraimer et al. |
| 8,196,835 B2 | 6/2012 | Emanuel et al. |
| 8,200,423 B2 | 6/2012 | Dietsch et al. |
| 8,204,624 B2 | 6/2012 | Zini et al. |
| 8,210,791 B2 | 7/2012 | Chilson et al. |
| 8,220,710 B2 | 7/2012 | Hoffman et al. |
| 8,229,619 B2 | 7/2012 | Roh et al. |
| 8,239,291 B2 | 8/2012 | Hoffman et al. |
| 8,265,873 B2 | 9/2012 | D'Andrea et al. |
| 8,269,643 B2 | 9/2012 | Chou |
| 8,271,132 B2 | 9/2012 | Nielsen et al. |
| 8,280,546 B2 | 10/2012 | D'Andrea et al. |
| 8,280,547 B2 | 10/2012 | D'Andrea et al. |
| 8,311,902 B2 | 11/2012 | Mountz et al. |
| 8,369,981 B2 | 2/2013 | Dunsker et al. |
| 8,381,982 B2 | 2/2013 | Kunzig et al. |
| 8,406,949 B2 | 3/2013 | Kondo |
| 8,412,400 B2 | 4/2013 | D'Andrea et al. |
| 8,417,444 B2 | 4/2013 | Smid et al. |
| 8,418,919 B1 | 4/2013 | Beyda |
| 8,433,442 B2 | 4/2013 | Friedman et al. |
| 8,433,469 B2 | 4/2013 | Harvey et al. |
| 8,444,369 B2 | 5/2013 | Watt et al. |
| 8,452,464 B2 | 5/2013 | Castaneda et al. |
| 8,457,978 B2 | 6/2013 | Williams et al. |
| 8,473,140 B2 | 6/2013 | Norris et al. |
| 8,483,869 B2 | 7/2013 | Wurman et al. |
| 8,498,734 B2 | 7/2013 | Dunsker et al. |
| 8,515,612 B2 | 8/2013 | Tanaka et al. |
| 8,538,692 B2 | 9/2013 | Wurman et al. |
| 8,571,781 B2 | 10/2013 | Bernstein et al. |
| 8,577,551 B2 | 11/2013 | Siefring et al. |
| 8,587,455 B2 | 11/2013 | Porte et al. |
| 8,594,834 B1 | 11/2013 | Clark et al. |
| 8,606,392 B2 | 12/2013 | Wurman et al. |
| 8,626,332 B2 | 1/2014 | Dunsker et al. |
| 8,626,335 B2 | 1/2014 | Wurman et al. |
| 8,639,382 B1 | 1/2014 | Clark et al. |
| 8,649,899 B2 | 2/2014 | Wurman et al. |
| 8,653,945 B2 | 2/2014 | Baek et al. |
| 8,670,892 B2 | 3/2014 | Yang |
| 8,676,426 B1 | 3/2014 | Murphy |
| 8,700,502 B2 | 4/2014 | Mountz et al. |
| 8,718,814 B1 | 5/2014 | Clark et al. |
| 8,725,286 B2 | 5/2014 | D'Andrea et al. |
| 8,725,317 B2 | 5/2014 | Elston et al. |
| 8,725,362 B2 | 5/2014 | Elston et al. |
| 8,725,363 B2 | 5/2014 | Elston et al. |
| 8,731,777 B2 | 5/2014 | Castaneda et al. |
| 8,751,063 B2 | 6/2014 | Bernstein et al. |
| 8,751,147 B2 | 6/2014 | Colwell |
| 8,755,936 B2 | 6/2014 | Friedman et al. |
| 8,760,276 B2 | 6/2014 | Yamazato |
| 8,761,989 B1 | 6/2014 | Murphy |
| 8,788,121 B2 | 7/2014 | Klinger |
| 8,798,784 B1 | 8/2014 | Clark et al. |
| 8,798,786 B2 | 8/2014 | Wurman et al. |
| 8,798,840 B2 | 8/2014 | Fong et al. |
| 8,805,573 B2 | 8/2014 | Brunner et al. |
| 8,805,574 B2 | 8/2014 | Stevens et al. |
| 8,825,257 B2 | 9/2014 | Ozaki et al. |
| 8,831,984 B2 | 9/2014 | Hoffman et al. |
| 8,862,397 B2 | 10/2014 | Tsujimoto et al. |
| 8,874,300 B2 | 10/2014 | Allard et al. |
| 8,874,360 B2 | 10/2014 | Klinger et al. |
| 8,880,416 B2 | 11/2014 | Williams et al. |
| 8,886,385 B2 | 11/2014 | Takahashi et al. |
| 8,892,240 B1 | 11/2014 | Vliet et al. |
| 8,892,241 B2 | 11/2014 | Weiss |
| 8,909,368 B2 | 12/2014 | D'Andrea et al. |
| 8,930,133 B2 | 1/2015 | Wurman et al. |
| 8,948,956 B2 | 2/2015 | Takahashi et al. |
| 8,954,188 B2 | 2/2015 | Sullivan et al. |
| 8,965,561 B2 | 2/2015 | Jacobus et al. |
| 8,965,562 B1 | 2/2015 | Wurman et al. |
| 8,965,578 B2 | 2/2015 | Versteeg et al. |
| 8,970,363 B2 | 3/2015 | Kraimer et al. |
| 8,972,045 B1 | 3/2015 | Mountz et al. |
| 8,983,647 B1 | 3/2015 | Dwarakanath et al. |
| 8,988,285 B2 | 3/2015 | Smid et al. |
| 8,989,918 B2 | 3/2015 | Sturm |
| 9,002,506 B1 | 4/2015 | Agarwal et al. |
| 9,002,581 B2 | 4/2015 | Castaneda et al. |
| 9,008,827 B1 | 4/2015 | Dwarakanath et al. |
| 9,008,828 B2 | 4/2015 | Worsley |
| 9,008,829 B2 | 4/2015 | Worsley |
| 9,008,830 B2 | 4/2015 | Worsley |
| 9,009,072 B2 | 4/2015 | Mountz et al. |
| 9,014,902 B1 | 4/2015 | Murphy |
| 9,020,679 B2 | 4/2015 | Zini et al. |
| 9,026,301 B2 | 5/2015 | Zini et al. |
| 9,043,016 B2 | 5/2015 | Filippov et al. |
| 9,046,893 B2 | 6/2015 | Douglas et al. |
| 9,052,714 B2 | 6/2015 | Creasey et al. |
| 9,056,719 B2 | 6/2015 | Tanahashi |
| 9,067,317 B1 | 6/2015 | Wurman et al. |
| 9,073,736 B1 | 7/2015 | Hussain et al. |
| 9,082,293 B2 | 7/2015 | Wellman et al. |
| 9,087,314 B2 | 7/2015 | Hoffman et al. |
| 9,090,214 B2 | 7/2015 | Bernstein et al. |
| 9,090,400 B2 | 7/2015 | Wurman et al. |
| 9,098,080 B2 | 8/2015 | Norris et al. |
| 9,110,464 B2 | 8/2015 | Holland et al. |
| 9,111,251 B1 | 8/2015 | Brazeau |
| 9,114,838 B2 | 8/2015 | Bernstein et al. |
| 9,120,621 B1 | 9/2015 | Curlander et al. |
| 9,120,622 B1 | 9/2015 | Elazary et al. |
| 9,122,276 B2 | 9/2015 | Kraimer et al. |
| 9,129,250 B1 | 9/2015 | Sestini et al. |
| 9,134,734 B2 | 9/2015 | Lipkowski et al. |
| 9,146,559 B2 | 9/2015 | Kuss et al. |
| 9,147,173 B2 | 9/2015 | Jones et al. |
| 9,150,263 B2 | 10/2015 | Bernstein et al. |
| 9,152,149 B1 | 10/2015 | Palamarchuk et al. |
| 9,185,998 B1 | 11/2015 | Dwarakanath et al. |
| 9,188,982 B2 | 11/2015 | Thomson |

(56) References Cited

U.S. PATENT DOCUMENTS

| | | | |
|---|---|---|---|
| 9,193,404 B2 | 11/2015 | Bernstein et al. | |
| 9,202,382 B2 | 12/2015 | Klinger et al. | |
| 9,206,023 B2 | 12/2015 | Wong et al. | |
| 9,207,673 B2 | 12/2015 | Pulskamp et al. | |
| 9,207,676 B2 | 12/2015 | Wu et al. | |
| 9,211,920 B1 | 12/2015 | Bernstein et al. | |
| 9,213,934 B1 | 12/2015 | Versteeg et al. | |
| 9,216,745 B2 | 12/2015 | Beardsley et al. | |
| 9,218,003 B2 | 12/2015 | Fong et al. | |
| 9,218,316 B2 | 12/2015 | Bernstein et al. | |
| 9,242,799 B1 | 1/2016 | O'Brien et al. | |
| 9,244,463 B2 | 1/2016 | Pfaff et al. | |
| 9,248,973 B1 | 2/2016 | Brazeau | |
| 9,260,244 B1 | 2/2016 | Cohn | |
| 9,266,236 B2 | 2/2016 | Clark et al. | |
| 9,268,334 B1 | 2/2016 | Vavrick | |
| 9,274,526 B2 | 3/2016 | Murai et al. | |
| 9,280,153 B1 | 3/2016 | Palamarchuk et al. | |
| 9,280,157 B2 | 3/2016 | Wurman et al. | |
| 9,290,220 B2 | 3/2016 | Bernstein et al. | |
| 9,304,001 B2 | 4/2016 | Park et al. | |
| 9,310,802 B1 | 4/2016 | Elkins et al. | |
| 9,317,034 B2 | 4/2016 | Hoffman et al. | |
| 9,329,078 B1 | 5/2016 | Mundhenke et al. | |
| 9,329,599 B1 | 5/2016 | Sun et al. | |
| 9,330,373 B2 | 5/2016 | Mountz et al. | |
| 9,341,720 B2 | 5/2016 | Garin et al. | |
| 9,342,811 B2 | 5/2016 | Mountz et al. | |
| 9,346,619 B1 | 5/2016 | O'Brien et al. | |
| 9,346,620 B2 | 5/2016 | Brunner et al. | |
| 9,352,745 B1 | 5/2016 | Theobald | |
| 9,355,065 B2 | 5/2016 | Donahue | |
| 9,365,348 B1 | 6/2016 | Agarwal et al. | |
| 9,367,827 B1 | 6/2016 | Lively et al. | |
| 9,367,831 B1 | 6/2016 | Besehanic | |
| 9,371,184 B1 | 6/2016 | Dingle et al. | |
| 9,378,482 B1 | 6/2016 | Pikler et al. | |
| 9,389,609 B1 | 7/2016 | Mountz et al. | |
| 9,389,612 B2 | 7/2016 | Bernstein et al. | |
| 9,389,614 B2 | 7/2016 | Shani | |
| 9,394,016 B2 | 7/2016 | Bernstein et al. | |
| 9,395,725 B2 | 7/2016 | Bernstein et al. | |
| 9,404,756 B2 | 8/2016 | Fong et al. | |
| 9,405,016 B2 | 8/2016 | Yim | |
| 9,427,874 B1 | 8/2016 | Rublee | |
| 9,429,940 B2 | 8/2016 | Bernstein et al. | |
| 9,429,944 B2 | 8/2016 | Filippov et al. | |
| 9,436,184 B2 | 9/2016 | D'Andrea et al. | |
| 9,440,790 B2 | 9/2016 | Mountz et al. | |
| 9,448,560 B2 | 9/2016 | D'Andrea et al. | |
| 9,451,020 B2 | 9/2016 | Liu et al. | |
| 9,452,883 B1 | 9/2016 | Wurman et al. | |
| 9,457,730 B2 | 10/2016 | Bernstein et al. | |
| 9,823,662 B2 | 11/2017 | Mecklinger et al. | |
| 10,328,836 B2 | 6/2019 | Purwin et al. | |
| 10,589,940 B2 | 3/2020 | Yang et al. | |
| 10,627,829 B2 | 4/2020 | Lin | |
| 10,628,790 B1 | 4/2020 | Aggarwal et al. | |
| 10,949,910 B2 * | 3/2021 | Carpenter | G06Q 30/0255 |
| 2004/0073359 A1 | 4/2004 | Ichijo et al. | |
| 2006/0245893 A1 | 11/2006 | Schottke | |
| 2010/0300841 A1 | 12/2010 | O'Brien | |
| 2012/0321423 A1 | 12/2012 | MacKnight et al. | |
| 2013/0058743 A1 | 3/2013 | Rebstock | |
| 2013/0302132 A1 | 11/2013 | D'Andrea | |
| 2014/0124462 A1 | 5/2014 | Yamashita | |
| 2014/0240117 A1 | 8/2014 | McKernan et al. | |
| 2014/0247116 A1 | 9/2014 | Davidson | |
| 2015/0073589 A1 | 3/2015 | Khodl et al. | |
| 2015/0081089 A1 | 3/2015 | Kapust et al. | |
| 2015/0117995 A1 | 4/2015 | D'Andrea | |
| 2015/0125252 A1 | 5/2015 | Berzen Ratzel | |
| 2015/0307278 A1 | 10/2015 | Wickham et al. | |
| 2016/0059875 A1 | 3/2016 | Segman et al. | |
| 2016/0090283 A1 | 3/2016 | Svensson et al. | |
| 2016/0176637 A1 | 6/2016 | Ackerman et al. | |
| 2016/0203543 A1 | 7/2016 | Snow | |
| 2016/0232477 A1 | 8/2016 | Cortes et al. | |
| 2016/0347545 A1 | 12/2016 | Lindbo et al. | |
| 2017/0043953 A1 | 2/2017 | Battles et al. | |
| 2017/0174431 A1 | 6/2017 | Borders et al. | |
| 2017/0182924 A1 | 6/2017 | Lendo et al. | |
| 2017/0229903 A1 * | 8/2017 | Jones | H02K 7/1846 |
| 2018/0057034 A1 | 3/2018 | Deshpande et al. | |
| 2018/0141752 A1 | 5/2018 | Nakanishi et al. | |
| 2018/0162433 A1 * | 6/2018 | Jones | B62B 5/0036 |
| 2018/0208398 A1 | 7/2018 | Haveman et al. | |
| 2019/0016573 A1 | 1/2019 | DAndrea | |
| 2019/0302775 A1 * | 10/2019 | Palan | B62B 5/02 |
| 2020/0103916 A1 | 4/2020 | Tu et al. | |

FOREIGN PATENT DOCUMENTS

| | | |
|---|---|---|
| CA | 1228142 A | 10/1987 |
| CA | 1238103 A | 6/1988 |
| CA | 1264490 A | 1/1990 |
| CA | 1267866 A | 4/1990 |
| CA | 1269740 A | 5/1990 |
| CA | 1271544 A | 7/1990 |
| CA | 1275721 C | 10/1990 |
| CA | 1276264 C | 11/1990 |
| CA | 2029773 A1 | 5/1991 |
| CA | 1291725 C | 11/1991 |
| CA | 2036104 A1 | 11/1991 |
| CA | 2042133 A1 | 1/1992 |
| CA | 2049578 A1 | 2/1992 |
| CA | 2296837 A1 | 2/1992 |
| CA | 2094833 A1 | 4/1992 |
| CA | 1304043 C | 6/1992 |
| CA | 2095442 A1 | 6/1992 |
| CA | 1304820 C | 7/1992 |
| CA | 1323084 C | 10/1993 |
| CA | 2189853 A1 | 11/1995 |
| CA | 2244668 A1 | 3/1999 |
| CA | 2469652 A1 | 6/2003 |
| CA | 2514523 A1 | 8/2004 |
| CA | 2565553 A1 | 11/2005 |
| CA | 2577346 A1 | 4/2006 |
| CA | 2613180 A1 | 1/2007 |
| CA | 2921584 A1 | 1/2007 |
| CA | 2625885 A1 | 4/2007 |
| CA | 2625895 A1 | 4/2007 |
| CA | 2837477 A1 | 4/2007 |
| CA | 2864027 A1 | 4/2007 |
| CA | 2636233 A1 | 7/2007 |
| CA | 2640769 A1 | 8/2007 |
| CA | 2652114 A1 | 12/2007 |
| CA | 2654258 A1 | 12/2007 |
| CA | 2654260 A1 | 12/2007 |
| CA | 2654263 A1 | 12/2007 |
| CA | 2654295 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781624 A1 | 12/2007 |
| CA | 2781857 A1 | 12/2007 |
| CA | 2838044 A1 | 12/2007 |
| CA | 2866664 A1 | 12/2007 |
| CA | 2921134 A1 | 12/2007 |
| CA | 2663578 A1 | 4/2008 |
| CA | 2860745 A1 | 4/2008 |
| CA | 2671955 A1 | 7/2008 |
| CA | 2673025 A1 | 7/2008 |
| CA | 2674241 A1 | 7/2008 |
| CA | 2691710 A1 | 12/2008 |
| CA | 2721345 A1 | 10/2009 |
| CA | 2760127 A1 | 11/2009 |
| CA | 2760225 A1 | 11/2009 |
| CA | 2743706 A1 | 6/2010 |
| CA | 2754626 A1 | 9/2010 |
| CA | 2765565 A1 | 1/2011 |
| CA | 2932535 A1 | 1/2011 |

(56) References Cited

FOREIGN PATENT DOCUMENTS

| | | |
|---|---|---|
| CA | 2932537 A1 | 1/2011 |
| CA | 2770139 A1 | 2/2011 |
| CA | 2773963 A1 | 3/2011 |
| CA | 2778111 A1 | 5/2011 |
| CA | 2784874 A1 | 7/2011 |
| CA | 2868578 A1 | 7/2011 |
| CA | 2806852 A1 | 2/2012 |
| CA | 2823715 A1 | 7/2012 |
| CA | 2827281 A1 | 8/2012 |
| CA | 2827735 A1 | 8/2012 |
| CA | 2770715 A1 | 9/2012 |
| CA | 2770918 A1 | 9/2012 |
| CA | 2831832 A1 | 10/2012 |
| CA | 2836933 A1 | 12/2012 |
| CA | 2851774 A1 | 4/2013 |
| CA | 2799871 A1 | 6/2013 |
| CA | 2866708 A1 | 9/2013 |
| CA | 2938894 A1 | 9/2013 |
| CA | 2813874 A1 | 12/2013 |
| CA | 2824189 A1 | 2/2014 |
| CA | 2870381 A1 | 4/2014 |
| CA | 2935223 A1 | 4/2014 |
| CA | 2894546 A1 | 6/2014 |
| CA | 2845229 A1 | 9/2014 |
| CA | 2899553 A1 | 10/2014 |
| CA | 2882452 A1 | 8/2015 |
| CA | 2886121 A1 | 10/2015 |
| WO | 2012/154872 A2 | 11/2012 |
| WO | 2016/015000 A2 | 1/2016 |
| WO | WO-2018017102 A1 * | 1/2018 |

OTHER PUBLICATIONS

US 9,050,932 B2, 06/2015, Bernstein et al. (withdrawn)
US 9,342,073 B2, 05/2016, Bernstein et al. (withdrawn)
Mannes, John, "Canvas' robot cart could change how factories work," https://techcrunch.com/2017/09/07/canvas-robot-cart-could-change-how-factories-work/. Posted Sep. 7, 2017, 5 pgs.
Da-Sol, Kim, "E-mart unveils autonomous shopping cart Eli for test run," http://www.koreaherald.com/view.php?ud=20180417000718, Apr. 17, 2018, 4 pgs.
Vincent, James, "LG unveils new concept robots for carrying your drinks, suitcase, and shopping," https://www.theverge.com/circuitbreaker/2018/1/4/16848886/lg-concept-robots-carrying-drinks-luggage-shopping, The Verge, Jan. 4, 2018, 2 pgs.
International Search Report and Written Opinion received for PCT Patent Application No. PCT/US17/54627, dated Jan. 5, 2018, 9 pages.
International Search Report and Written Opinion received for PCT Patent Application No. PCT/US18/12641, dated Mar. 7, 2018, 10 pages.
International Search Report and Written Opinion received for PCT Patent Application No. PCT/US18/12645, dated Mar. 7, 2018, 12 pages.
Warehouse Robots at Work, IEEE Spectrum, Jul. 21, 2008. YouTube https://www.youtube.com/watch?v=IWsMdN7HMuA. (see attached PDF screenshots).

* cited by examiner

AUTONOMOUS SHOPPING CART

BACKGROUND

The present specification generally relates to improving the customer experience of a user by providing an intelligent, automated shopping cart and associated methods and systems.

Current carts, such as shopping carts, may be pushed or pulled while carrying items. They may be heavy and difficult to push and do not provide assistance to users interacting with the carts. Machinery, such as fork lifts, exists to move larger loads or pallets of items; however, these are not suitable for use by the public, for example, in a retail environment.

Attempts to bridge the gap between ordinary push carts and automated machinery have been bulky, not user friendly, and have required significant maintenance, for example, by requiring large amounts of storage space, manual battery replacement or charging, and failing to facilitate user interaction with the cart, a retail computer, or external devices.

SUMMARY

Various innovative aspects, including systems, methods, interfaces, and other implementations, for providing a smart cart system, are described. In some implementations, the smart cart system may include a cart including: a frame, and an item holder supported by the frame, the cart configured to transition between an open position and a storage position, the storage position being a more compact position than the open position; a motivator coupled to the frame and configured to provide a motive force to propel the cart in an operating environment; a power source attached to the cart and coupled to a computing device and the motivator to provide power; a charging interface attached to the frame of the cart, the charging interface configured to interact with a cart charging system of a cart storage rack to charge the power source; a user interface device; the computing device attached to cart and coupled to the user interface device and the motivator; and a smart cart controller operable on the computing device and configured to perform operations including: receiving information describing an attribute of an item, and providing the information describing the attribute of the item for presentation by the user interface device.

Implementations may include one or more of the following features. The smart cart system where: the frame includes a support housing, the cart includes a hinge mechanism coupling the item holder with the support housing, and transitioning the item holder into the storage position includes pivoting the item holder using the hinge mechanism to position the item holder into the storage position, the storage position being a nesting position in which the cart is configured to nest with an item holder of another cart. The smart cart system where the hinge mechanism includes a motor, and the smart cart controller is configured to instruct the motor to apply force to the hinge mechanism that causes the item holder to transition between the open position and the storage position. The smart cart system where: the frame includes a first support housing and a second support housing, the first support housing is affixed to a cross beam at a first end of the cross beam and the second support housing is affixed to the cross beam at a second end of the cross beam, and the cross beam provides vertical support to the item holder when items are loaded into the item holder, the item holder pivoting away from the cross beam when the item holder transitions into the storage position. The smart cart system where: the frame includes a first support housing positioned at a first side of the item holder and a second support housing positioned at a second side of the item holder, and the power source includes a battery housed within one or more of the first support housing and the second support housing. The smart cart system where: the motivator includes one or more motors, the first support housing holds a first motor of the one or more motors, the first motor coupled with a first wheel, the second support housing holds a second motor of the one or more motors, the second motor coupled with a second wheel, and the smart cart controller selectively drives the first motor and the second motor to provide the motive force to the cart.

Implementations may include one or more of the following features. The smart cart system where: the cart includes a handle bar coupled with one or more of the item holder and the frame, and the user interface device includes a touch screen display coupled with the handle bar, the touch screen display receiving user input and displaying the information describing the attribute of the item. The smart cart system where: the handle bar is coupled with the item holder and is configured to move with the item holder when the item holder transitions to the storage position. The smart cart system where the operations include: identifying a location of a user in an operating environment using an optical sensor coupled with the smart cart controller, and instructing the motivator to provide the motive force to the cart to follow the user as the user moves within the operating environment using the location of the user. The smart cart system where: the smart cart controller is communicatively coupled with a scanner, and the operations include receiving scan data from the scanner and identifying the item based on the scan data. The smart cart system where the operations include: capturing one or more of a bar code, a QR (quick response) code, and an image of the item using the scanner, transmitting the captured scan data to a server and, in response, receiving the information describing the attribute of the item from the server, and providing a graphical interface including a virtual shopping cart on the user interface device, the virtual shopping cart displaying the information describing the attribute of the item. The smart cart system where the operations include: receiving, by the user interface device, input from a user indicating to purchase the item and, in response, transmitting data describing the input to the server to facilitate a purchase of the item, receiving confirmation from the server that the item has been successfully purchased, and transmitting a message indicating that the item has been purchased to a store computing system associated with the smart cart system.

Implementations may include one or more of the following features. The smart cart system where the operations include: determining a location of the item in an operating environment associated with smart cart system, determining a current location of the cart in the operating environment, determining a path from the current location of the cart to the location of the item in the operating environment, receiving input confirming to navigate to the location of the item in the operating environment, and navigating the cart to the location of the item using the determined path, the motivator, and a guidance system communicatively coupled with the smart cart controller. The smart cart system where the operations include: receiving, by the user interface device, a request for help, determining metadata associated with the request, the metadata describing one or more of a location of the cart, an identification of the item, and a status of the smart cart system, generating a message including the metadata and based on the request for help, transmitting the message to a store computing system associated with the smart cart system, and outputting, by the user interface device, a notification indicating that a store associate has been notified of the request for help. The smart cart system further including: the cart storage rack including the cart charging system, the cart charging system including a rail that interacts with the charging interface supported by the frame, the rail of the cart storage rack configured to simultaneously charge a plurality of carts.

Another general aspect may include a smart cart system including a basket supported by one or more support housings, a hinge mechanism coupling the basket with the one or more support housings, the basket configured to transition to a storage position, the storage position being configured to reduce storage space consumed by multiple smart carts when the multiple smart carts are in storage, transitioning the basket into the storage position including pivoting the basket using the hinge mechanism to allow the basket to nest with a basket of another smart cart, one or more motors coupled with the one or more support housings, the one or more motors configured to provide motive force to the smart cart, a user interface device coupled with the one or more support housings, a computing device coupled with the user interface device and the one or more motors, and a battery coupled with the computing device and the one or more motors; a charging support member coupled with the one or more support housings, the charging support member including a charging interface that interacts with a rail of a cart storage rack to charge the battery of the smart cart; and a smart cart controller operable on the computing device and configured to perform operations including instructing the smart cart to autonomously navigate within an operating environment.

Another general aspect may include a computer-implemented method including: receiving, by a smart cart controller, information describing an attribute of an item; providing, by the smart cart controller, the information describing the attribute of the item for presentation by a user interface device communicatively coupled with the smart cart controller; determining, by the smart cart controller, a location of the item in an operating environment associated with smart cart system; and determining, by the smart cart controller, a current location of a cart in the operating environment; and navigating, by the smart cart controller, the cart to the location of the item using a determined path between the current location of the cart and the location of the item in the operating environment, a motivator providing motive force to the cart, and a guidance system communicatively coupled with the smart cart controller.

Other implementations of one or more of these aspects include corresponding systems, apparatus, and computer programs, configured to perform the actions of the methods, encoded on computer storage devices.

The technology provides an efficient and adaptable smart cart that may solve the deficiencies of the solutions described in the Background, for example. It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

Figure 1A:
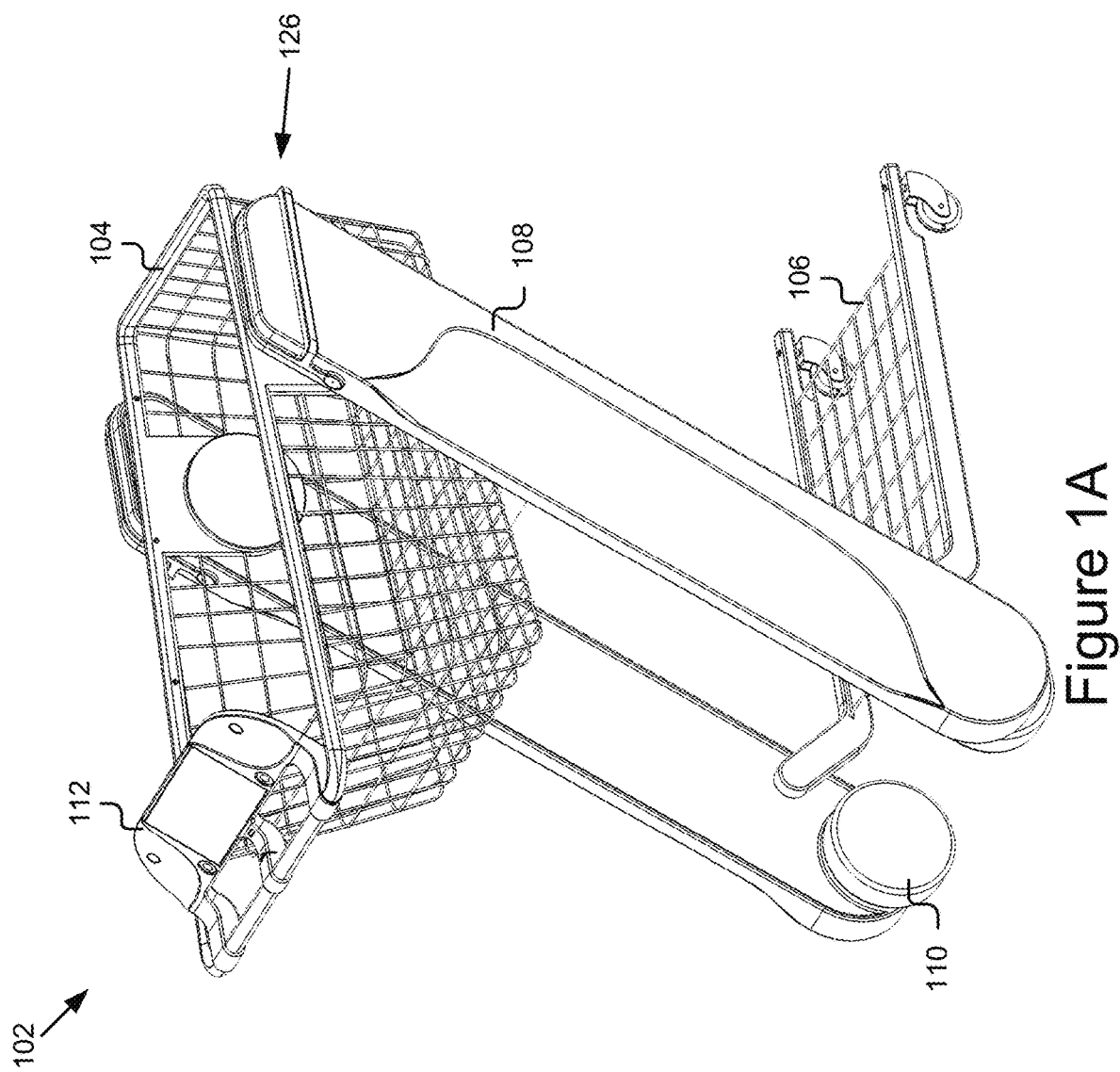
FIGS. 1A-1H are illustrations of an example smart cart.

According to some implementations of the technology described herein, an autonomous shopping cart automated guided vehicle ("AGV") or "smart cart" may include a motorized, intelligent shopping cart. For example a smart cart system may include a smart cart 102 including motors and sensors allowing it to follow a customer or otherwise autonomously navigate in an operating environment. In some implementations, the smart cart 102 may provide a display screen and a data connection, for example, to a remote server 1222 or a local store computing system 1206 that allows a customer/user to search for products, provides information such as reviews and recommendations, and guides customers to the location of products in the operating environment. In some implementations, the smart cart 102 may include scanner or other sensors that recognize items and provide information to the display screen to allow the user to gather information and, in some instances, purchase items in the card. For instance, a user may interact with the cart using a touch screen display and/or conversational e-commerce technology.

In some implementations, the smart cart system described herein includes hardware, computing systems, methods, user interfaces, data, and other aspects that may perform the operations described herein. For example, the smart cart 102 may deploy automatically when summoned by a user and may then autonomously track and follow the user throughout the store. In some implementations, the smart cart 102 may track and record items placed into and removed from the cart. In some implementations, the smart cart 102 may provide conversational artificial intelligence that provides assistance to a user to find products in a store, find information about the products, navigate to the location of the products in the store (e.g., using navigation markers, computer vision, etc.), and, in some instances, purchase the products. Additionally, in some implementations, the smart cart 102 may provide assistance to a user to purchase items that are not available or in stock in the store, for example, by allowing the user to purchase the items for delivery (e.g., via an online website, etc.) via a user interface device 112 of the smart cart 102. In some implementations, once the user has completed shopping and has removed the items from the cart, for example, in a parking lot, the smart cart 102 may recognize that it is empty (or may otherwise receive confirmation from the user or a store associate) and autonomously return to the store (e.g., to a storage rack 202, as described herein).

The features and advantages described herein are not all-inclusive and many additional features and advantages will be apparent to one or ordinary skill in the art in view of the figures and description. Also, it should be noted that the language used in the specification has been selected for readability and instructional purposes and not to limit the scope of the inventive subject matter.

The disclosure is illustrated by way of example, and not by way of limitation in the figures of the accompanying drawings in which like reference numerals are used to refer to similar elements.

For the purposes of this disclosure, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1B:
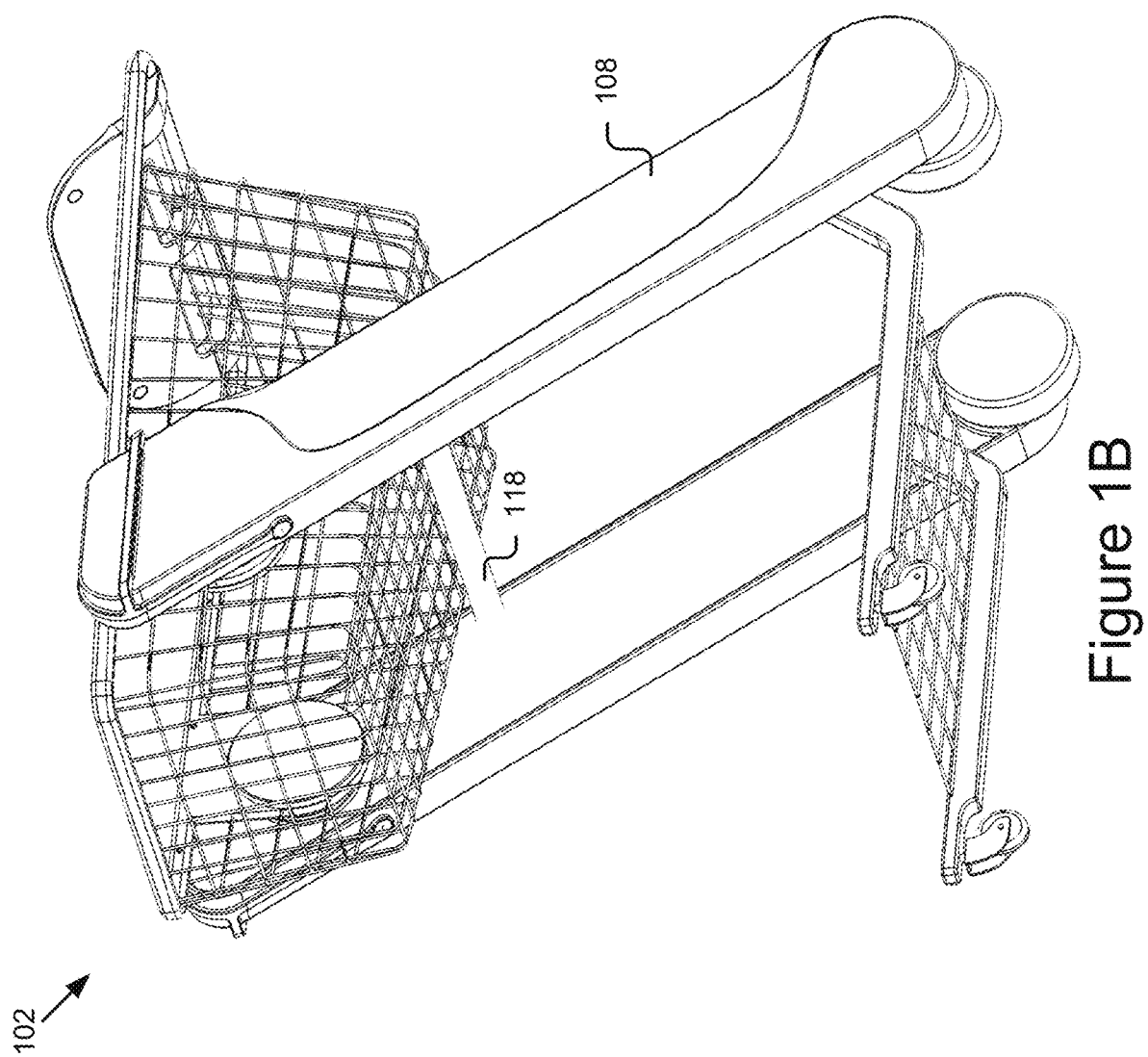
Figure 1C:
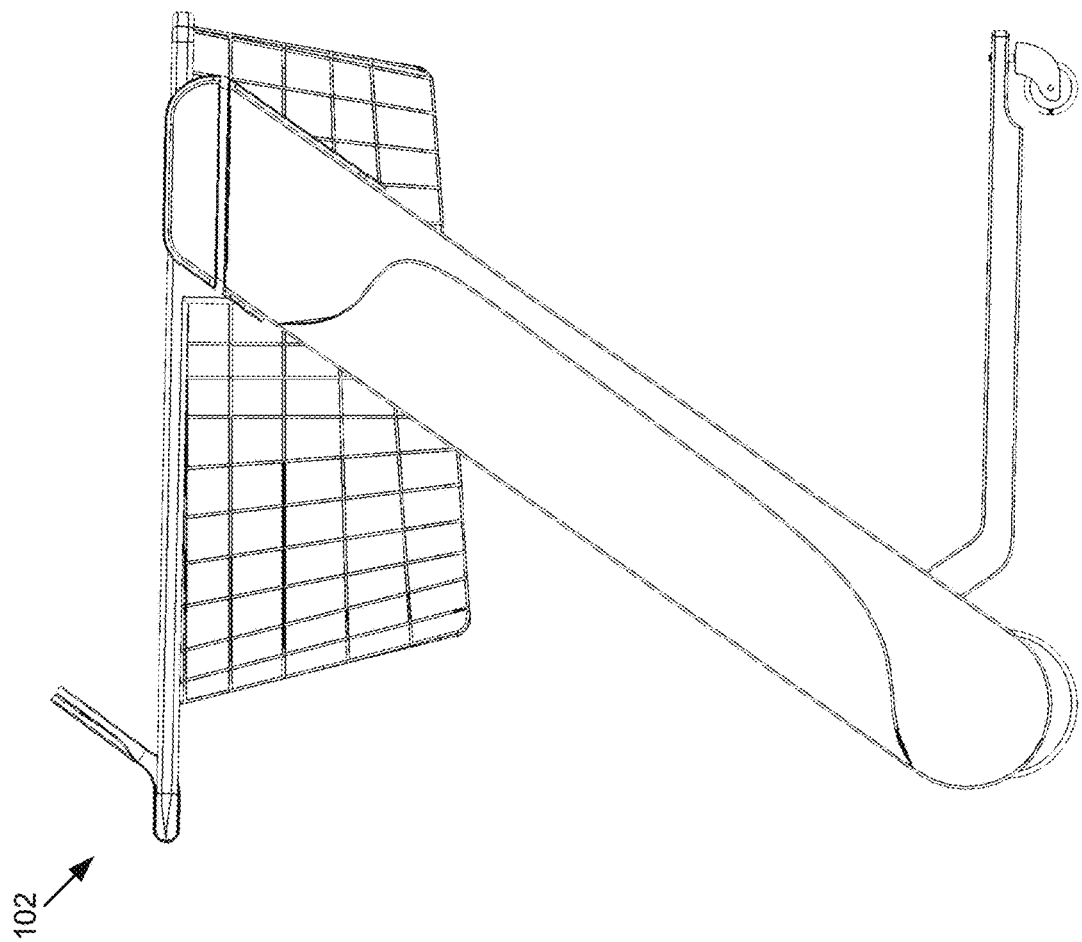
Figure 1D:
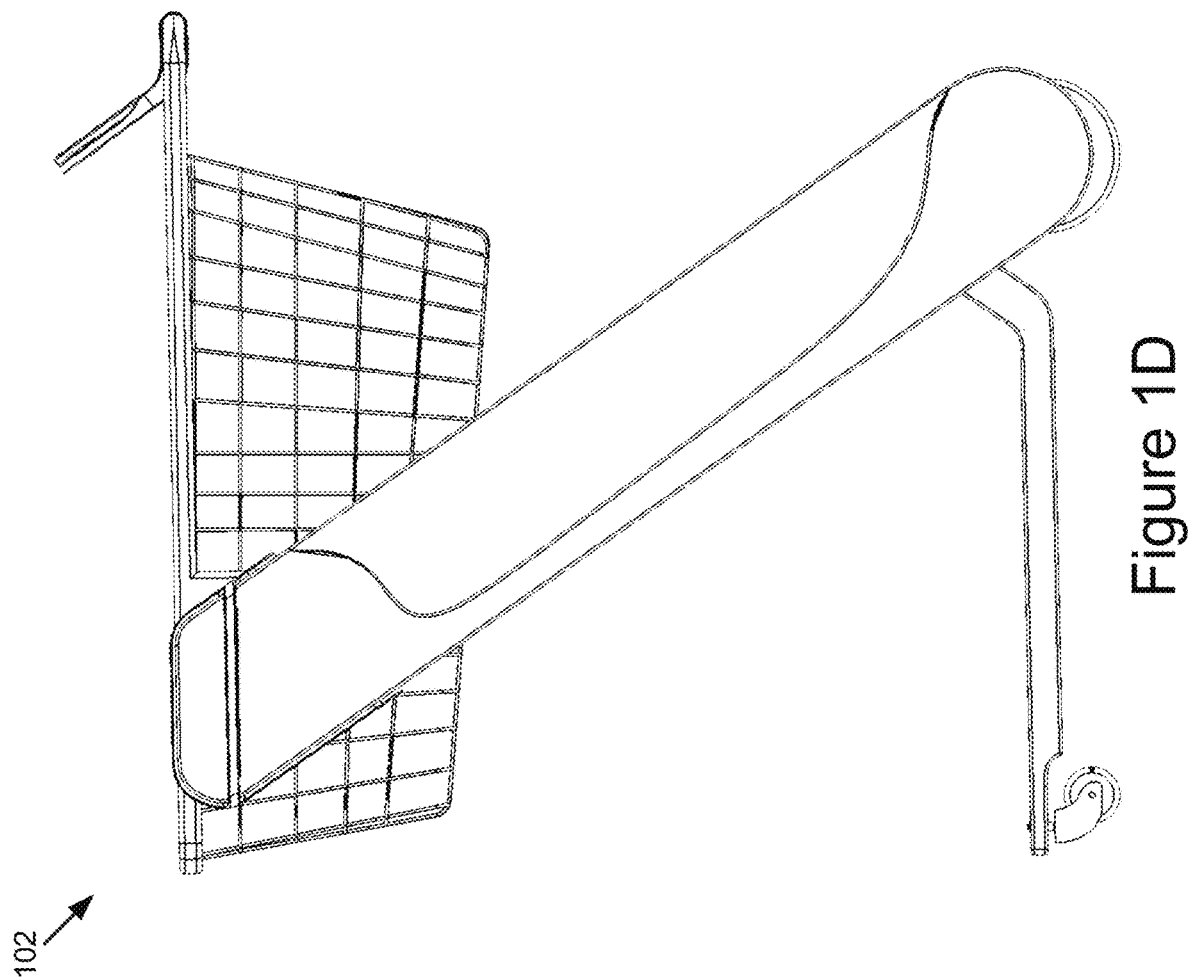
Figure 1E:
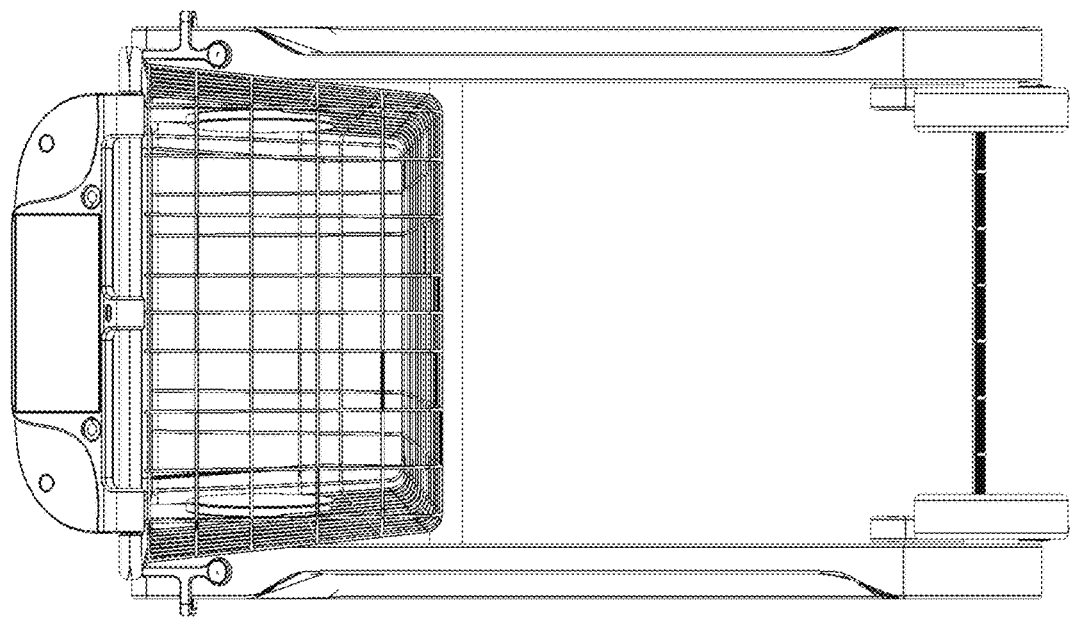
Figure 1F:
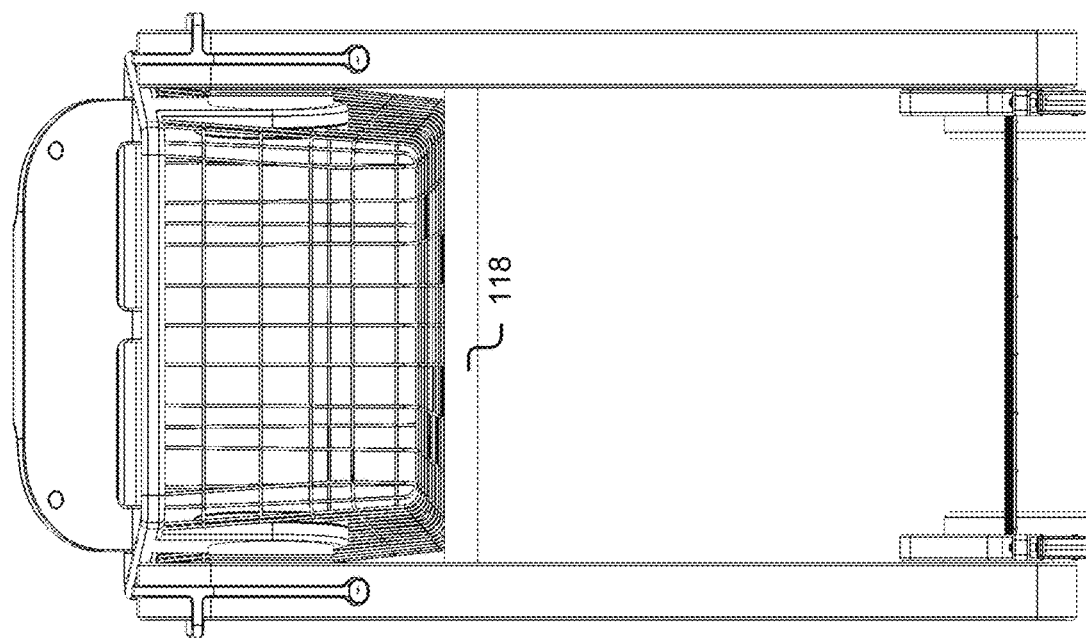
Figure 1G:
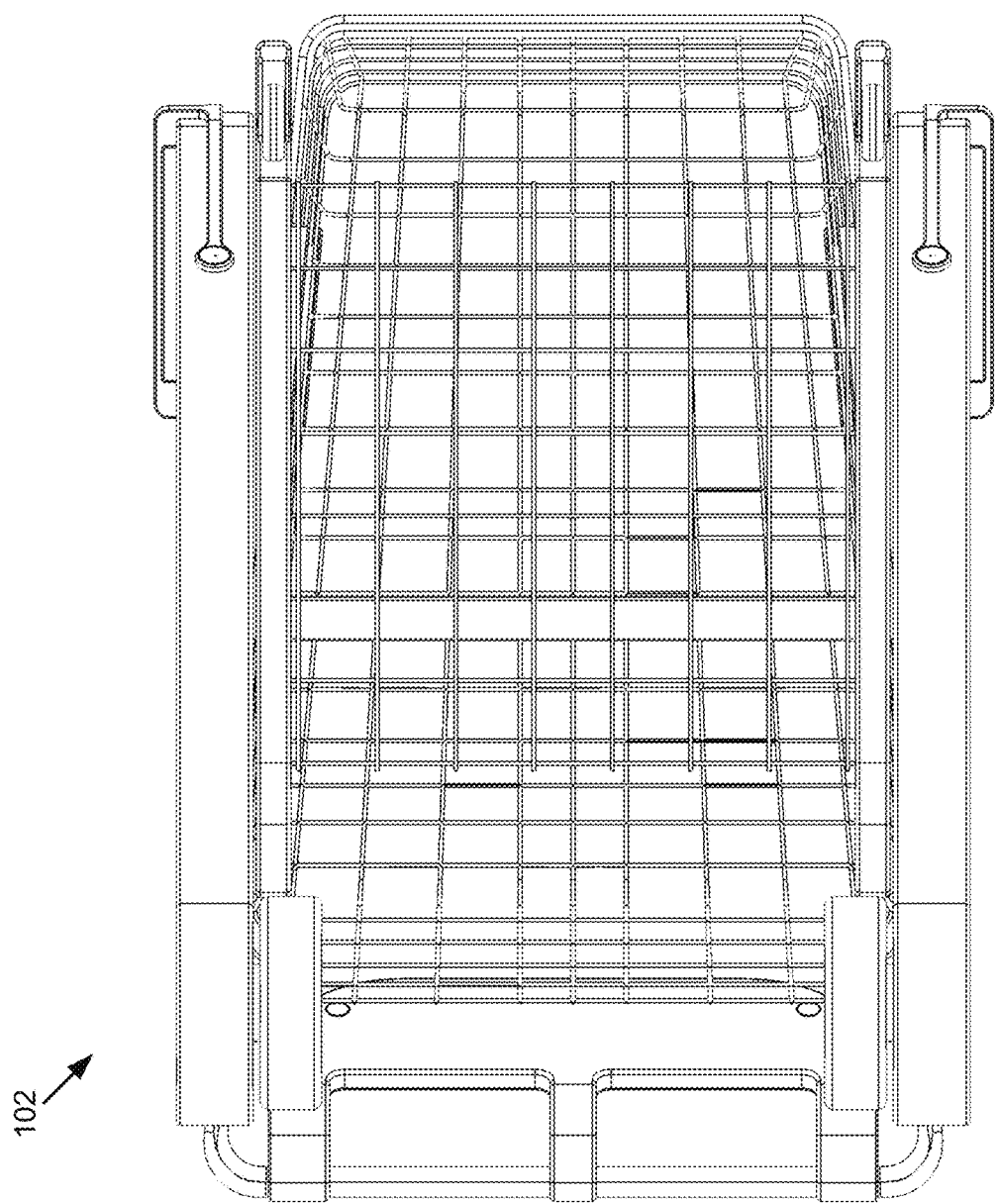
Figure 1H:
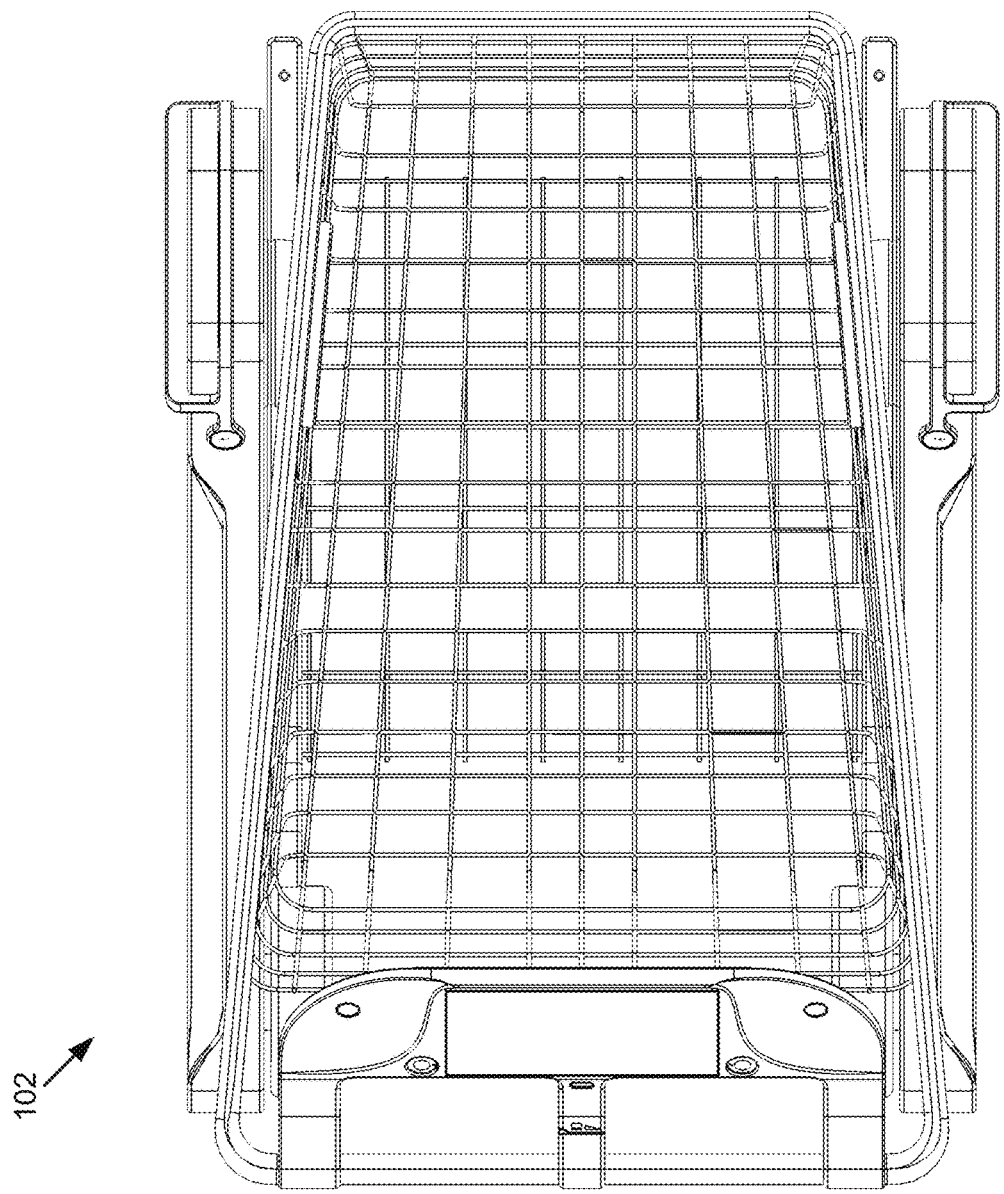

FIGS. 1A-1H are illustrations of an example smart cart 102. In particular, FIG. 1A illustrates a back perspective view of the example smart cart 102, FIG. 1B illustrates a front perspective view of the example smart cart 102, FIG. 1C illustrates a right-side view of the example smart cart 102, FIG. 1D illustrates a left-side view of the example smart cart 102, FIG. 1E illustrates a back view of the example smart cart 102, FIG. 1F illustrates a front view of the example smart cart 102, FIG. 1G illustrates a bottom-up view of the example smart cart 102, and FIG. 1H illustrates a top-down view of the example smart cart 102.

In the depicted implementation, the smart cart 102 includes an item holder 104, a bottom rack 106, a frame, a motivator (e.g., motorized wheels 110), and a user interface device 112. Although not visible in FIG. 1, the smart cart 102 may also include a guidance system or other navigation hardware, computing hardware (e.g., processors, memory, etc.), communication hardware (e.g., Wi-Fi, Bluetooth, or other radios), sensors, and other components (e.g., batteries, chargers, etc.).

The frame may include one or more support housings 108 that support components of the smart cart 102. For instance, a support housing 108 may house and/or support the basket, bottom rack 106, motors, or wheels, etc. The support housing 108 may, in some implementations, also house a computing device (e.g., which may execute the smart cart controller 1120, operating systems, drivers, etc.), one or more power sources (e.g., batteries, capacitors, etc.), motors, hinge mechanisms, or cooling devices, etc. The support housing 108, as well as other components of the smart cart 102, may support and conceal wiring connecting the power source, charging hardware, computing device, user interface device 112, motors, antennas, and/or sensors, etc.

The support housing 108 may provide vertical support to the basket and, in some instances, a bottom rack 106 of the smart cart 102. For instance, a first support housing 108 may be positioned at a first side (e.g., the right side illustrated in FIG. 1C) of the basket, and a second support housing 108 may be positioned at a second side (e.g., the left side illustrated in FIG. 1D) of the basket. Similarly, the support housings 108 may support a bottom rack 106, as illustrated in FIGS. 1A-1H.

The support housings 108 may be coupled with the basket via a hinge mechanism 402, as described in further detail below. In some implementations, wiring may also be concealed and protected by the hinge mechanism 402 (e.g., a cover thereof), for example, to couple the user interface device 112 with a computing device, power source, or motor held by the support housing 108. The smart cart 102 may also include a cross beam 118 connecting a first support housing 108a with a second support housing 108b and, in some implementations, providing support to the basket. The cross beam 118 is shown and described in more detail in reference to FIG. 4.

In some implementations, as illustrated, the support housing(s) 108 may be angled from a back end at the bottom of the smart cart 102 to a front end at the top of the smart cart 102. For instance, drive wheels and/or the motors coupled thereto may be held at the back of the smart cart 102 by the support housings 108. In some implementations, a basket, or other item holder 104, may be held proximate to the front of the smart cart 102 at a position forward of a midpoint of the basket, so that the weight of the basket is supported either partially or completely by the cross beam 118. It should be noted that this configuration is provided by way of example and that other implementations are possible and contemplated, for instance, the support housings 108 may be vertical, or angled backwards, or have a different shape or orientation.

The smart cart 102 may include motor driven wheels 110 that may allow the smart cart 102 to move without human interaction. For instance, the motor driven wheels 110 may be coupled with the power source and with a smart cart controller 1120 that issues directions to the wheels (e.g., to motors coupled with the wheels) indicating distances and speeds to travel, for instance, to navigate the cart through an operating environment, follow a user, etc. In some implementations, the motors may be mounted in the wheels or the support housings 108. The motors may include any type of appropriate motor, for example, the motors may include induction motors which allow the motor to be completely shut off to enable the cart to be easily rolled when the batteries are dead or a customer otherwise wishes to push the cart manually, for example.

In some implementations, the smart cart 102 can also or alternatively be used as a motor-assisted push cart, for instance, if autonomy is not needed. For example, the smart cart 102 may provide a propel assist that allows a user to push a portion of the weight/resistance of the smart cart 102. In some instances, the smart cart 102 may determine that autonomy isn't possible or otherwise available (e.g., due to certain obstacles in the operating environment, a sensor error, etc.) and may switch to a propel-assist mode thereby allowing the user to perform some or all of the navigation.

A support housing 108 may house or otherwise be coupled with one or more wheels, which may be motorized to provide motive force to the smart cart 102. For instance, a left support housing 108 may hold a first motor coupled with a first drive wheel and the right support housing 108 may hold a second motor coupled with a second drive wheel. The smart cart controller 1120 may selectively drive the first and second motor to provide motive and, in some instances, turning force to the smart cart 102. It should be noted that other implementations are possible, such as a single motor driving one or more wheels, for example, where a single motor drives two wheels, a slip differential may be provided to allow the cart to turn.

The item holder 104 may include a flat surface, bag, bucket, basket, etc., but it should be understood that the item holder 104 may include any device for holding one or more items. For example, a basket may include a solid or wire net basket, for example, and may be supported by one or more support housings 108. In some implementations, the basket may be configured to transition into a storage position, so that the storage space consumed by multiple smart carts 102 is reduced when multiple carts are in storage. For instance, while a fixed basket is possible, one or more components of the basket may collapse, move, or change orientation to decrease storage space consumed by multiple smart carts 102.

In some implementations, the basket may be coupled with a support housing 108 using a hinge mechanism 402 allowing the basket to transition between an in-use or open position and a storage position, for example, as illustrated in FIGS. 6A-6E.

In some implementations, the smart cart 102 may also include a bottom rack 106 coupled with one or more of the support housings 108 and the basket. In some instances, the bottom rack 106 may also include one or more wheels, such as casters. A component or the entirety of the bottom rack 106 may be hinged to fold when in the storage position, as illustrated, or the bottom rack 106 may be fixed in place. Depending on the implementation, the smart cart 102 may also include a fixed or foldable support that couples the bottom rack 106 to a support housing 108 or basket to provide additional rigidity to the bottom rack 106/smart cart 102.

The smart cart 102 may include a charging interface that interacts with a cart charging system (e.g., a rail 204 or other component) of a cart storage rack 202 to charge the power source (e.g., a battery) of the smart cart 102. In some implementations, the charging interface may be integrated with or otherwise coupled with a support member 126 that is coupled with the one or more support housings 108. An example charging interface and an example support member 126 are described in reference to FIGS. 2 and 4.

In some implementations, the smart cart 102 may include a computing device (e.g., as in the example of FIG. 11) that executes one or more software processes. For instance, a computing device may be coupled with a user interface device 112, the motors (e.g., of the motorized wheels 110), a power source, and/or one or more other devices, such as a remote computing device via a network, as described in reference to FIG. 12. In some implementations, a smart cart controller 1120 may be hardware or software, for example, operable on the computing device.

The smart cart controller 1120 may communicate with sensors and/or device drivers to receive sensor input, control motors, output data, etc. In some implementations, the computing device and/or smart cart controller 1120 may be integrated with or may otherwise communicate with the user interface device 112 and/or another component of the system 1200 (e.g., described in reference to FIG. 12). The smart cart controller 1120 may perform other operations, as described throughout this description, for example, in reference to FIGS. 10A-10D.

In some implementations, the smart cart 102 may include a user interface device 112 (e.g., coupled with the computing device) that may receive a query from a user, send the query to a server 1222, receive information describing an attribute of an item relating to the query (e.g., an item present in an operating environment associated with the smart cart 102), and output (e.g., display on a screen) the information describing the attribute of the item. The user interface device 112 may be coupled with a support housing 108, basket, or other component of the smart cart 102 or, in some instances, an application running on a user device (e.g., a smartphone, etc.) may communicate with the smart cart controller 1120 to perform operations described herein (e.g., via Bluetooth, Wi-Fi, the server 1222, etc.) in reference to the user interface device 112. An example user interface device 112 is illustrated and described in reference to FIG. 3 below.

In some implementations, the smart cart 102 may include communication hardware coupled with the computing device and/or user interface device 112. For instance, as described in further detail below, the communication hardware may communicate with a server 1222 to find item information, location, or other data, send queries and receive responses, send messages to a computing system in a store, or perform other operations, for example, as described herein. In some instances, in order to perform its operations, the smart cart 102 may communicate with a computing device in the store or may communicate with one or more servers 1222 via, for example, a network, such as the Internet.

In some implementations, the smart cart system may include or interact with a guidance system that determines a position/location of the smart cart 102 in an operating environment, such as a retail store. For instance, the smart cart controller 1120 may follow instructions based on the guidance system to navigate the smart cart 102 through a store. For example, the guidance system may include guidance system locators or markers, such as guide tape (magnetic, colored, etc.), laser target navigation, inertial navigation, vision guidance, geolocation, QR codes on the floor of the order fulfillment facility, RFID (radio frequency identification) tags, beacons, etc., that can be used to locate and navigate AGVs in the order fulfillment facility. Further, the smart cart 102 may include navigation hardware components configured to read the guidance system locators, such as a QR code reader, wireless radio, etc.

In some implementations, for example, navigation hardware may include GPS, computer vision, sonar, radar, LIDAR (Light Detection and Ranging), or other hardware configured to locate the smart cart 102 within an environment, recognize and avoid obstacles (e.g., people, shelving, or other objects), identify and follow a user, navigate the smart cart 102 within the environment (e.g., by following a calculated path through a store). For instance, onboard cameras (e.g., stereo cameras, etc.) may allow the smart cart 102 to navigate through pre-determined environments safely and track a customer while in use.

In some implementations, the smart cart 102 may include other sensors coupled with the smart cart controller 1120. The sensors may include, for instance, cameras, bar code scanners, NFC (near field communication) sensors, or RFID (radio frequency identification) tag readers that identify items placed into a basket (or otherwise scanned by the user) or removed from the basket. For instance, as described below, the smart cart controller 1120 may add an identified item to a virtual cart or list (or mark as compete on a shopping list displayed on the user interface device 112) to provide convenience or accelerate checkout/purchase of the physical items from the store (e.g., by skipping or shortening time spent at a point of sale or cash register). These and other operations and devices are described throughout this disclosure, for example, in reference to FIG. 3.

Figure 2:
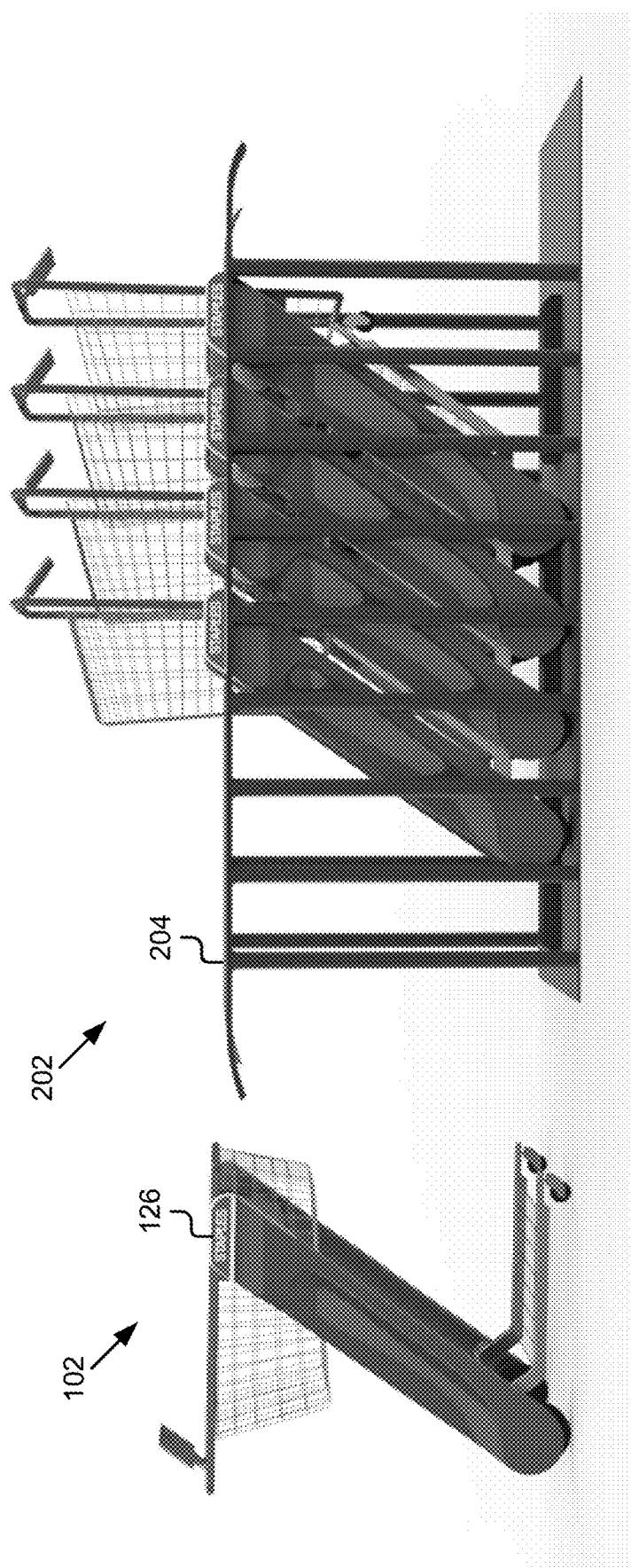
FIG. 2 is an illustration of an example smart cart and example cart storage rack.

FIG. 2 is an illustration of an example smart cart 102 and example cart storage rack 202. The cart storage rack 202 may store and, in some implementations, support one or more smart carts 102 in a folded or storage position. In some implementations, the smart storage rack 202 may also include a communication mechanism for communicating with a store computing system 1206, smart cart 102, or the Internet, etc., a charging mechanism, and/or a rail 204 that may charge, support, or guide the smart cart 102 in the storage position.

For example, a cart charging system/mechanism may be built into the base, vertical supports, and/or the rails 204 of the smart storage rack 202. In some implementations, the cart storage rack 202 may include a rail 204 that interacts with a charging interface on the smart cart 102, for example, so that the rail 204 of the cart storage rack 202 may simultaneously or sequentially charge a plurality of smart carts 102. The cart charging system may include contact based interfaces (e.g., a plug or electrical contact) or contactless based interfaces (e.g., an induction coil or other electromagnetic-based charging).

In some implementations, the rail(s) 204 may include a conductive contact area that provides current to the smart cart 102 via a corresponding conductive contact area 404 on the charging support member(s) 126 of the smart cart 102. For example, the charging interface may be supported by the support member 126, as described elsewhere herein, such as in reference to FIG. 4. In some instances, the rails 204 (or another component of the smart storage rack 202) may include inductive charging strips, which, in combination with corresponding inductive charging receivers in the smart cart 102, charge the smart cart 102 when in the smart storage rack 202.

In some implementations, the rails 204 may support the smart cart 102 when it is in a storage position. For example, the smart cart 102 may include a support member 126 that extends over or otherwise interacts with the rail 204 to support the smart cart 102, for example, when in a folded or other storage position. A height of the rail 204 may be configured to match or exceed a height of the support surface, so that the rail 204 partially supports or lifts the smart cart 102. For example, in implementations where the bottom rack 106 includes wheels and folds or moves, as illustrated in FIGS. 6A-6E, the support surface may support the support housings 108 while allowing the motorized wheels 110 to propel the smart cart 102. In implementations where the front wheels and/or bottom rack 106 are fixed relative to the support housing(s) 108, the rail 204 may lift the front wheels and/or bottom rack 106 to allow them to slide over those of another smart cart 102.

In some implementations, the cart charging system may include various mechanisms to avoid a user receiving a shock, for instance, the cart charging system may include a cover, separated charging contacts, or mechanisms for ceasing charging when a user is within a given range of the cart charging system. For instance, the cart charging system may use computer vision or another sensor (e.g., as described in reference to the smart cart 102 above) to detect when a user is within a defined range and, in response, may shut off charging capabilities. Additionally or alternatively, the cart storage rack 202 may be located in a separate room or container to reduce contact with users.

In some implementations, the smart cart 102 may autonomously navigate to and couple with (e.g., as illustrated in reference to FIGS. 6A-6B) the cart storage rack 202 (e.g., the cart charging mechanism). The smart cart 102 may also be autonomously deployed from the cart storage rack 202. For example, a store computing device, server 1222, user device (e.g., a smartphone), etc., may transmit a request to the cart storage rack 202 and/or smart cart 102 to deploy, in response to which, the smart cart 102 may decouple from the cart storage rack 202 and navigate to a defined location. In some implementations, each smart cart 102 may autonomously navigate from an entry point of the cart storage rack 202 to an exit point of the cart storage rack 202 when a cart is deployed, returned, or a battery charge is completed, for example.

Figure 3:
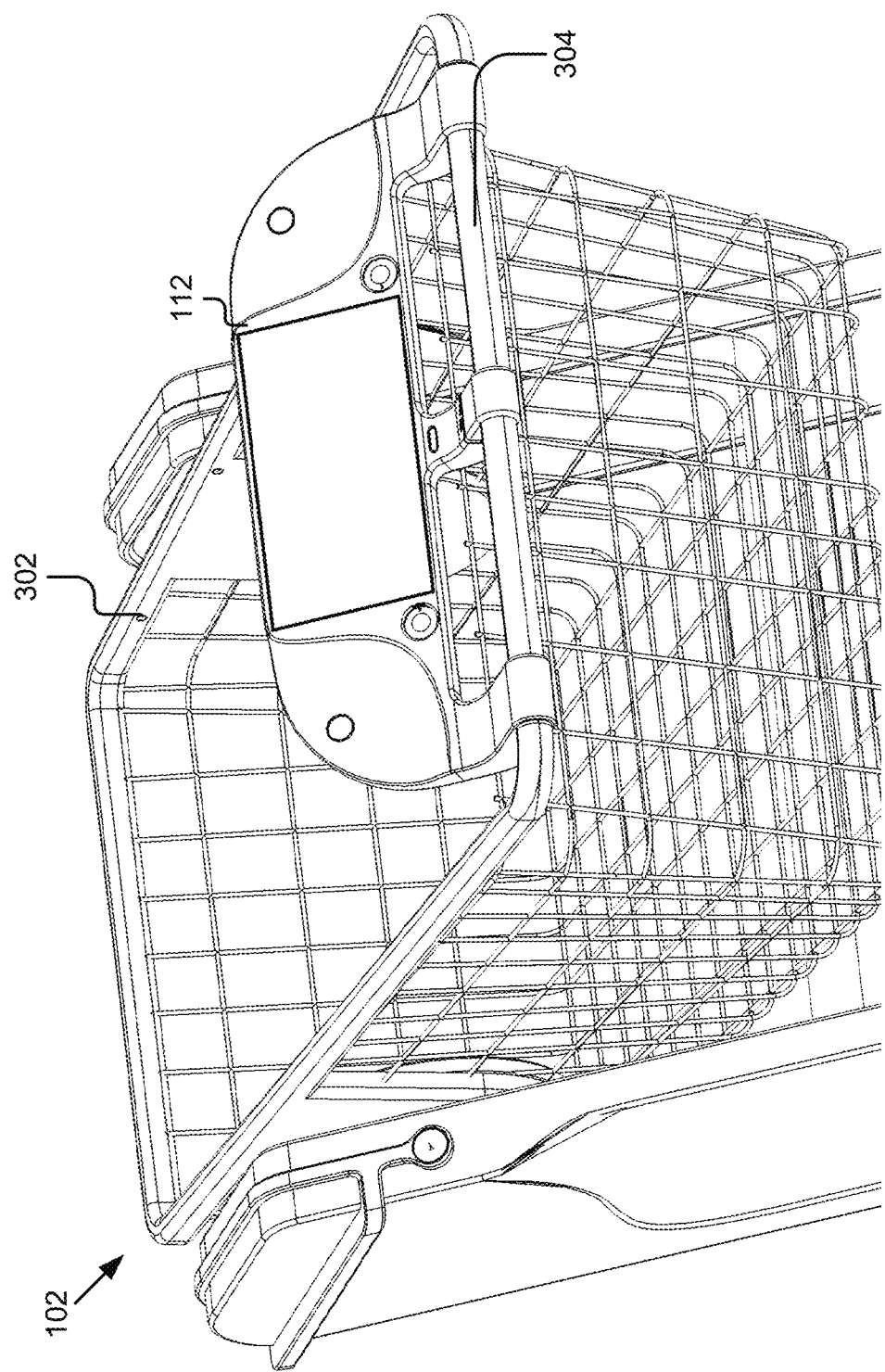
FIG. 3 is an illustration of an example user interface device coupled with an example smart cart.

FIG. 3 is an illustration of an example user interface device 112 coupled with an example smart cart 102. The user interface device 112 may include a touch screen, microphone, speaker, and/or buttons for interacting with the smart cart 102. For instance, the touch digitizer of the touch screen or microphone may receive input from the user, and a display screen or speaker may provide outputs to the user.

In some implementations, the user interface device 112 may be coupled with, for example, a handle bar 304, an item holder 104, or a support housing 108. For example, as illustrated, the user interface device 112 may include a touch screen display coupled with the handle bar 304.

In some implementations, the user interface device 112 may house or otherwise communicate with one or more other components of the smart cart 102, such as cameras, scanners, motors, etc. In some implementations, a smart cart controller 1120 configured to control the smart cart 102 may be fully or partially (e.g., when the functionality of the smart cart controller 1120 is distributed between multiple computing systems) executed on the smart cart 102, such as on computing system (e.g., the computing system 1100 discussed in FIG. 11) housed with the display or in the support housings 108 of the smart cart 102.

In some implementations, the smart cart 102 may include cameras or scanners (e.g., as described above) that may scan items as they are added to the basket (or otherwise scanned, for example, by a barcode scanner coupled with the user interface device 112). For instance, the smart cart 102 may include cameras or scanners integrated with the user interface device 112 and/or the rim of the item holder 104 may include sensors 302 (e.g., optical or radio sensors, as described above). For instance, when a user adds an item to the basket, it may be scanned, and information pertaining to the item may be displayed on the display. For example, the user interface device 112 may retrieve data describing scanned items and may display information representing the items in the basket in a virtual shopping cart. In some instances, the items in the cart may additionally or alternatively display representations of items ordered for home delivery (e.g., items out of stock at the store).

In some implementations, the user may checkout (e.g., purchase the items) using the user interface device 112, for example, by reading a credit card in a card reader coupled to the smart cart 102, by charging a card associated with the user's profile, etc. In some implementations, the user may be able to add items to the virtual cart that are out of stock in addition to those in the physical basket and checkout for all items in the virtual cart at the same time whether for home delivery or pickup at the store.

In some implementations, the user interface device 112 may provide an e-commerce or augmented commerce experience to the user, which allows the user to find item information (e.g., prices, reviews, promotions, item location, whether the item is in stock, etc.), order items (e.g., for home delivery), navigate to items in the store, request assistance from a store associate, purchase the items in the smart cart 102 (e.g., as a self-checkout or assisted checkout process), or pose other queries to the smart cart 102.

In some implementations, the user interface device 112 may provide a conversational AI interface (e.g., executed by the smart cart controller 1120 or another module) with the user, for instance, through the display or verbal communication (e.g., input via the microphone and output through the screen or speaker). In some instances, the conversational AI may provide an e-commerce experience that allows the user to request guidance to specific items, aisle locations, or order out-of-stock items, for example.

In some implementations, the conversational AI may be built on top of or integrated into an available conversational interface (e.g., Google Assistant™, Apple Siri™, or Amazon Alexa™, etc.) or may be purpose built for the retail or smart cart controller 1120. For instance, the conversational AI may include pre-built (e.g., using decision trees, keywords, etc.), learned (e.g., using a neural network or other machine learning), or other AI conversations. For instance, the smart cart 102 may receive input from the user that the user wishes to look at printers (e.g., via an input from the touch screen, microphone, shopping list, etc.) the smart cart 102 can interact with a customer to direct the customer to a location where a printer is located, indicate that the specific store carries five printers in a given price range (and, in some instances, more printers online) or ten printers of a given type, etc. In another example, the smart cart 102 may receive input from the user that the user wishes to speak with a store associate, in which instance, the smart car may notify a store associate of the user's request.

In some implementations, the user/customer can input a customer number or other ID into the user interface device 112 to identify the user. For example, the smart cart controller 1120 may communicate with a server 1222 or store computing system 1206 to access a user profile associated with the user, which may include data describing user preferences, shopping history, a shopping list, coupons, payment information, etc., associated with the user profile. For instance, the user may build a shopping list online (or on a mobile app, etc.), which may be displayed on the display of the user interface device 112. In some instances, the smart cart controller 1120 may automatically generate a path and navigate through the store and, when a customer places the item in the item holder 104, automatically proceed to the next item in the list.

In some implementations, the user interface device 112 may automatically apply online coupons, show particular ads to the user (e.g., based on the user's purchase history, current location in the store, online history, an item placed in the cart, an item in the shopping list, etc.), information regarding related or alternative/replacement items in the store, etc. For example, a display of the user interface device 112 may provide augmented reality, ads, etc., as the user walks through the store.

In some implementations, the user interface device 112 may also display a charge indicator, map of an operating environment, total cost of items scanned into the cart, planogram data, product reviews for scanned items, determined or customized coupons, or other information.

These another other example implementations may be described in further detail in reference to FIGS. 10A-10D.

Figure 4:
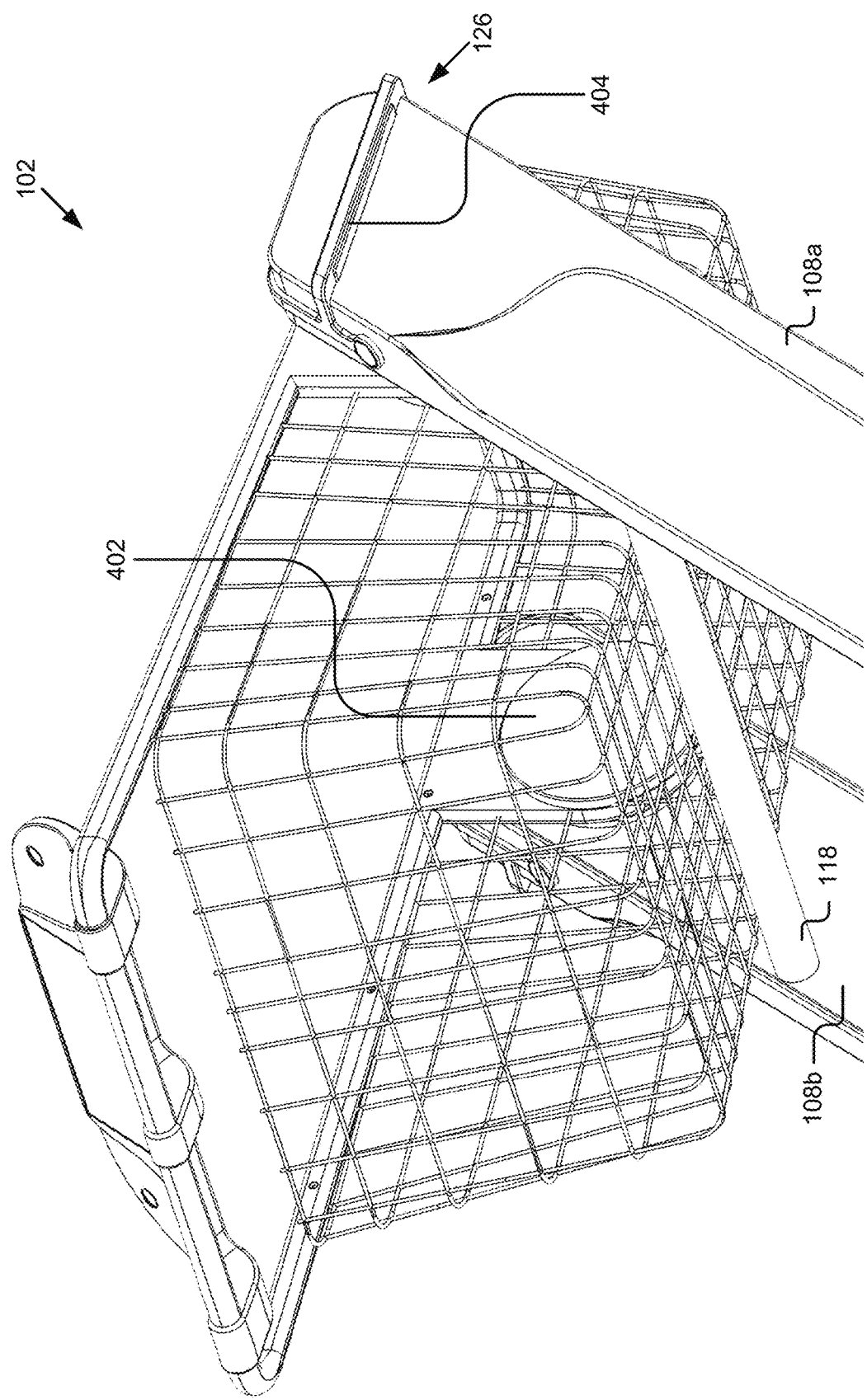
FIG. 4 is an illustration of an example smart cart support member and charging interface.

FIG. 4 is an illustration of an example smart cart support member 126 and charging interface, as discussed in further detail elsewhere herein. As illustrated, the support member 126 may include an inductive coil, conductive contact, or conductive wheel, for charging the smart cart 102. The support member 126 may be built into a support housing 108 or coupled thereto, for example, as illustrated.

In some implementations, the charging interface may interact with a rail 204 of a cart storage rack 202 to charge the power source of the smart cart 102, for example, as described above. For instance, the charging interface may include a conductive contact 404 supported by the support member 126.

Figure 6A:
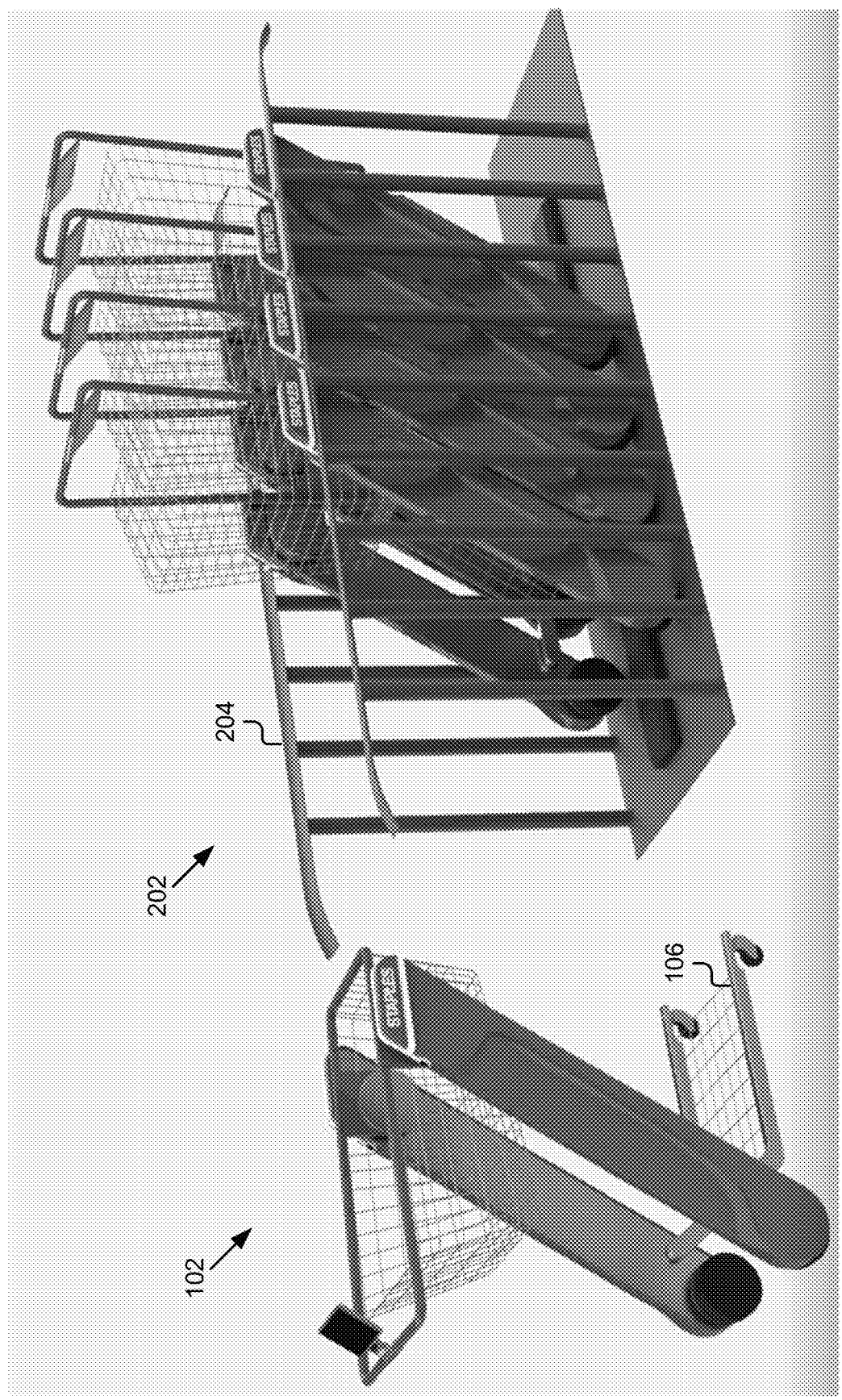
FIGS. 6A-6E are illustrations depicting an example operation of an example smart cart folding and entering an example smart cart storage rack.
Figure 6B:
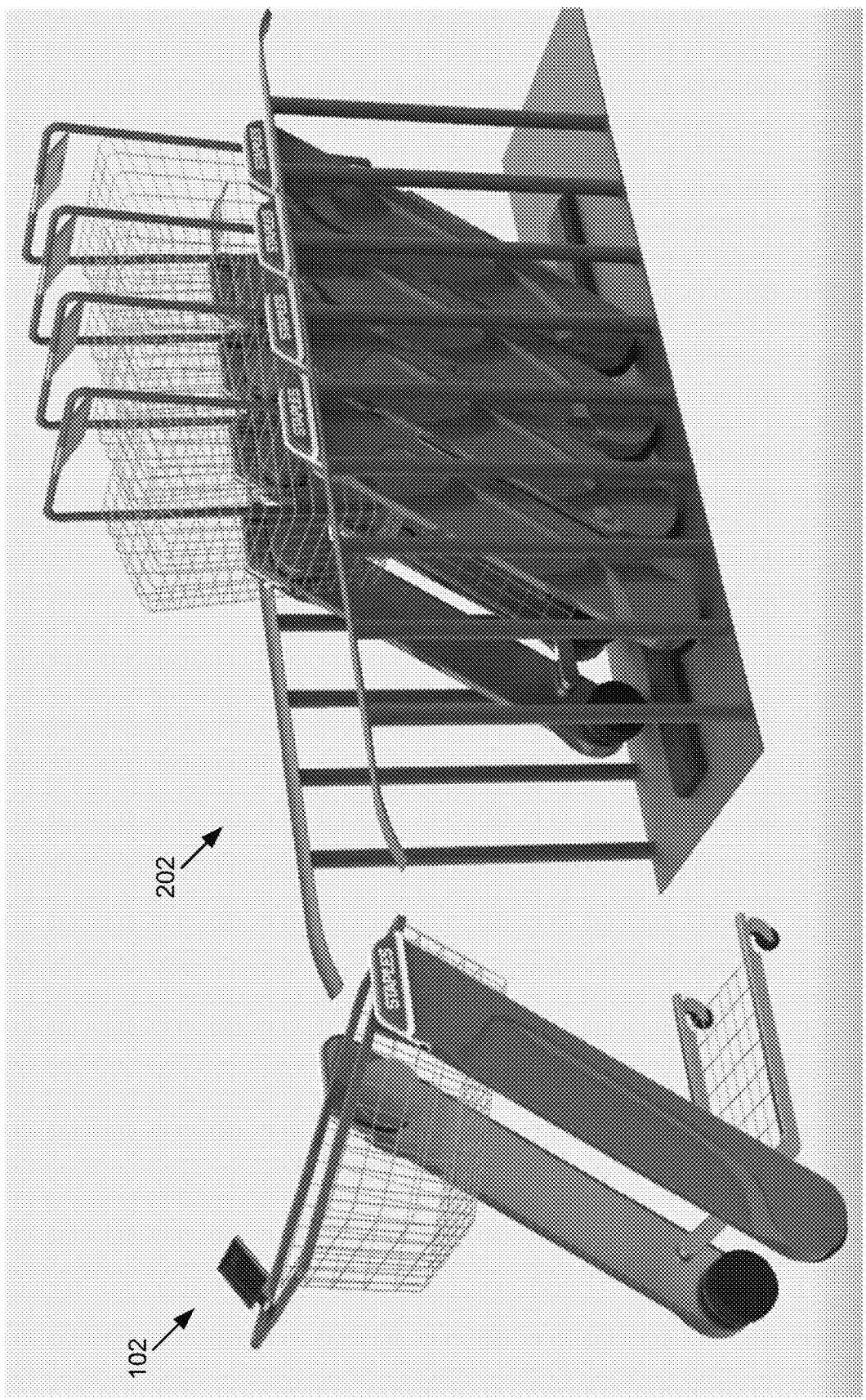
Figure 6C:
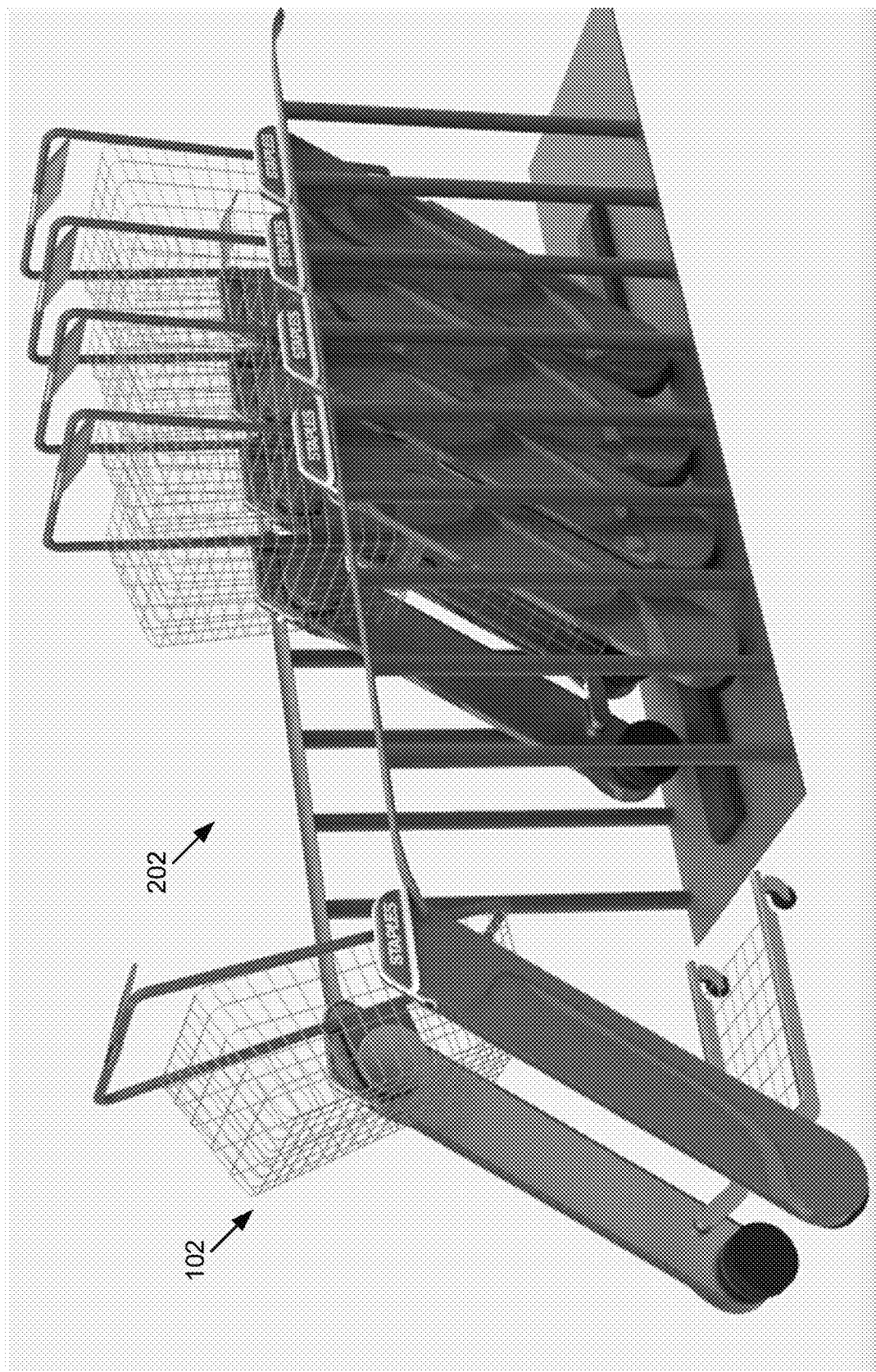

As illustrated, the frame of the smart cart 102 may include a first support housing 108a and a second support housing 108b. The first and second support housings 108 may be coupled by other components of the smart cart 102, for example by a hinge mechanism 402, a cross beam 118, a bottom rack 106 (not shown in FIG. 4), or other components. For instance, the support housings 108 may be coupled with an item holder 104 (e.g., a basket) via the hinge mechanism 402, which may allow the item holder 104 to transition to a storage position, for example, as illustrated in reference to FIGS. 6A-6E. In some implementations, the hinge mechanism 402 may include a motor that moves the item holder 104 between an open position (e.g., as illustrated in FIGS. 1A-1H) and a storage position (e.g., as illustrated in FIG. 6E).

In some implementations, a first support housing 108a may be affixed to a cross beam 118 at a first end of the cross beam 118 and the second support housing 108b may be affixed to the cross beam 118 at a second end of the cross beam 118. In some instances, the cross beam 118 provides vertical support to the item holder 104 when items are loaded into the item holder 104. In some implementations, as illustrated in FIGS. 6A-6E, the item holder 104 may pivot away from the cross beam 118 when the item holder 104 transitions into the storage position.

Figure 5:
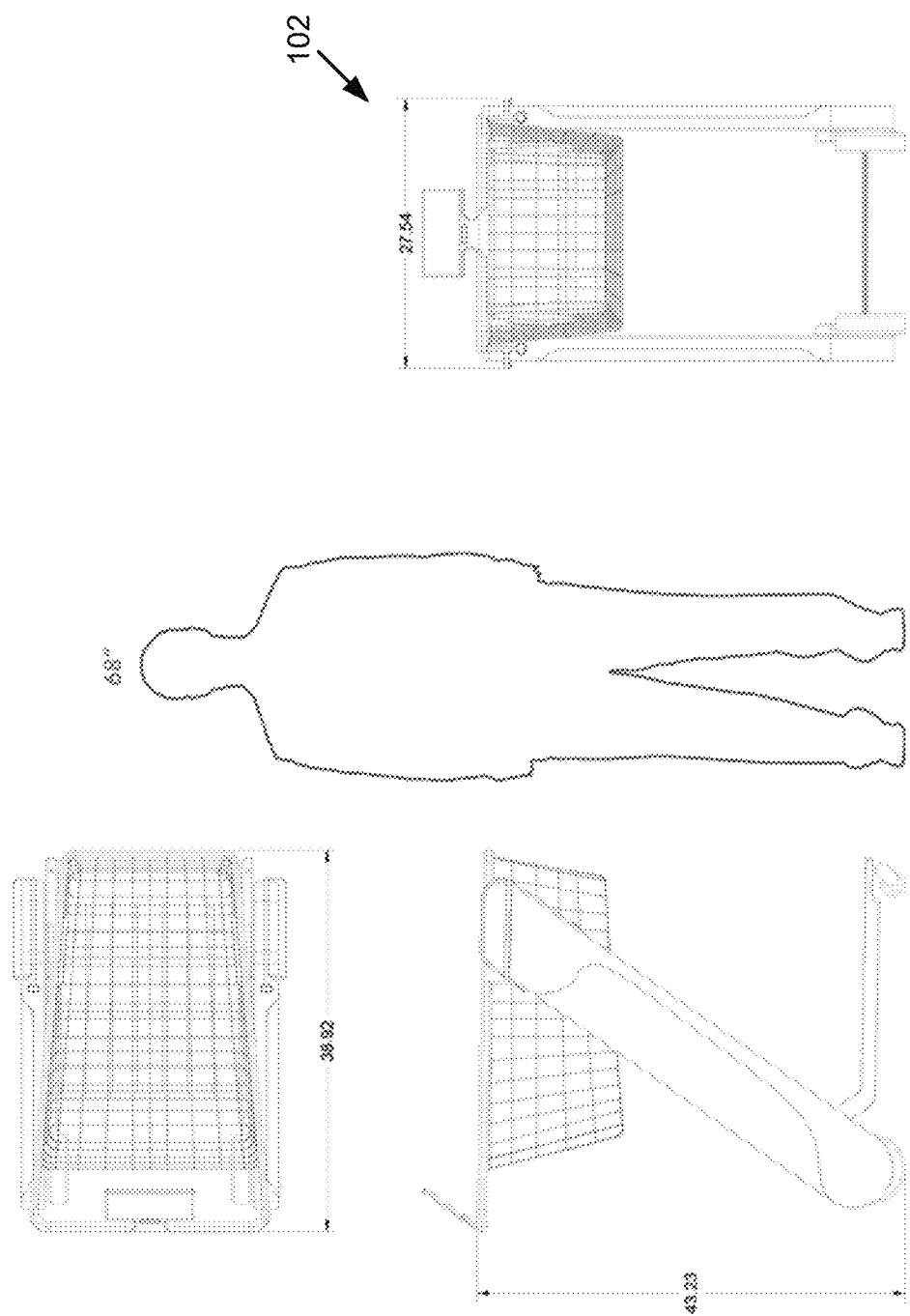
FIG. 5 illustrates example dimensions of a smart cart according to some implementations.

FIG. 5 illustrates example dimensions of a smart cart 102 according to some implementations. For example, the smart cart 102 may have a length of approximately 39 inches, a width of approximately 28 inches, and a height of approximately 43 inches; although, it should be noted that these dimensions are provided by way of example and that other implementations are possible and contemplated.

FIGS. 6A-6E are a series of illustrations depicting an example operation of an example smart cart 102 folding and entering an example smart cart storage rack 202. For example, the smart cart 102 may be designed to fold or transform when not in use in order to reduce its footprint during storage, especially when multiple smart carts 102 are stored together.

In some implementations, the item holder 104 may pivot about a hinge mechanism 402, for example, a basket may pivot forward so that multiple baskets nest together. In some implementations, the hinge mechanism 402 may include a motor and the smart cart controller 1120 may instruct the motor to apply a force to the hinge mechanism 402 to cause the item holder 104 to transition between an in-use position and the storage position.

Figure 6D:
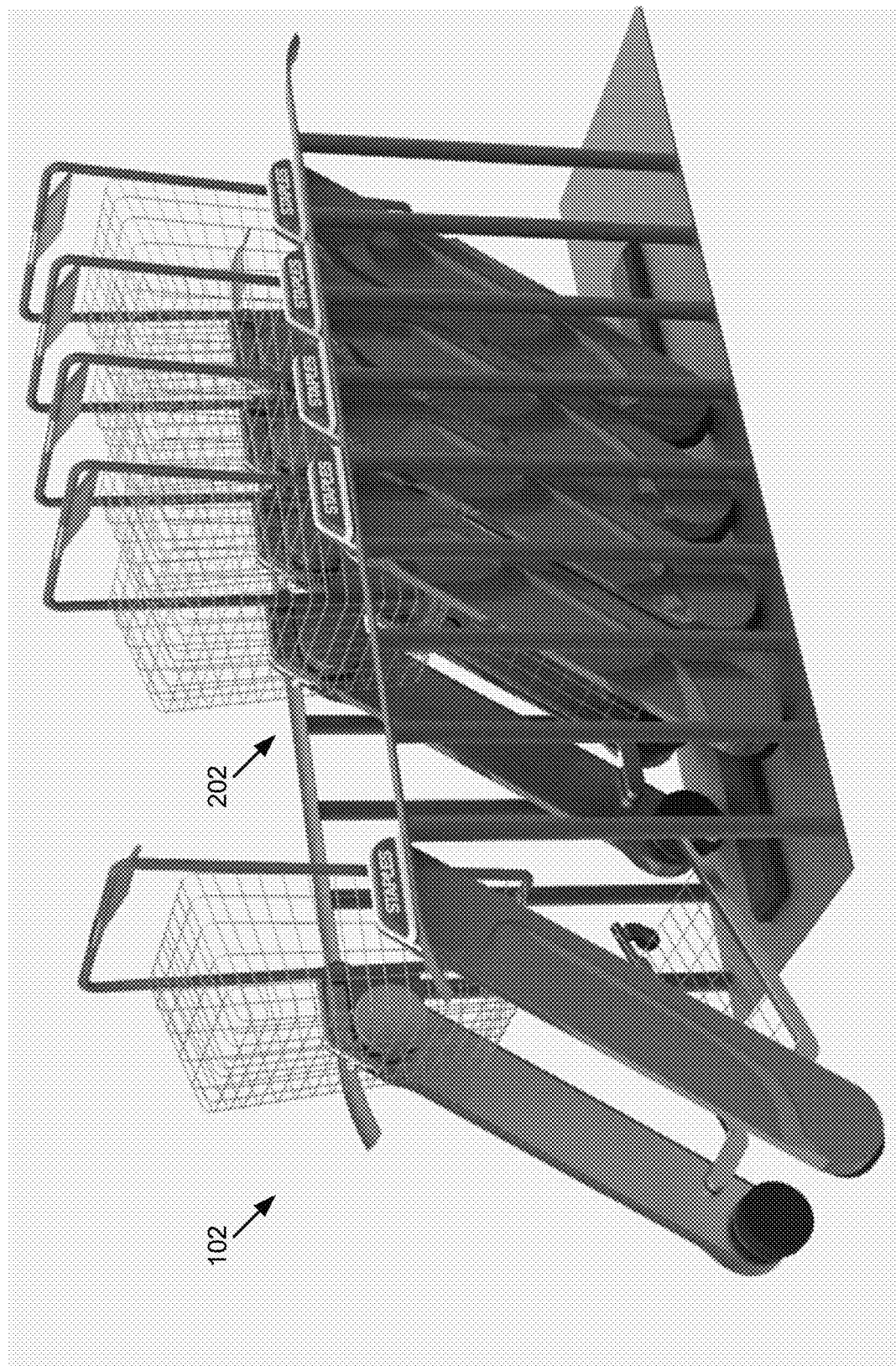
Figure 6E:
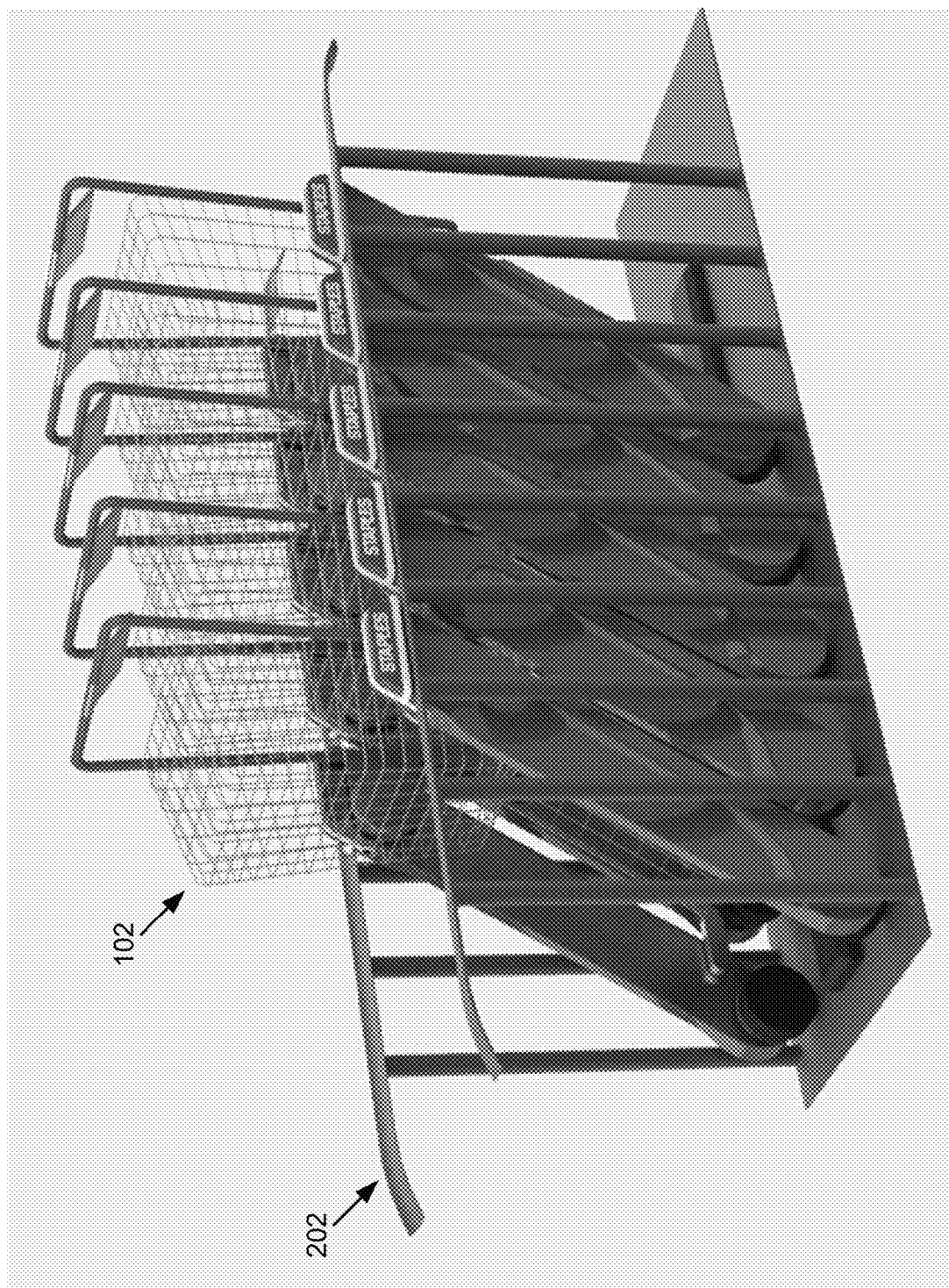

In some implementations, as illustrated in FIGS. 6D and 6E, the smart cart 102 may include a bottom rack 106 that may fold upwards when the smart cart 102 is in the storage position, for example, so that the bottom rack 106 fits between a first and second support housing 108 of the smart cart 102, or of another smart cart 102 in the cart storage rack 202. The bottom rack 106 may include wheels, motors, or other mechanisms, as described above.

In some implementations, the bottom rack 106 may include an additional support mechanism and/or may be fixed in place. The bottom rack 106 may lift over, fit under, or fit between bottom racks 106 of another smart cart 102.

The item holder 104 (e.g., a basket) and bottom rack 106 may fold/adjust into a compact position using motors (e.g., in their hinges, etc.) or may use physical contact with the smart storage rack 202 or other smart carts 102 to push the rack and/or basket into the folded position. Similarly, a user may manually lift the basket into a vertical position (e.g., when it is placed into the smart cart rack), depending on the implementation In some implementations, the smart cart 102 may transition to the storage position (e.g., fold, move, or rotate the item holder 104) once it makes contact with the rails 204 of the smart storage rack 202, which allows the smart cart 102 to be vertical or slanted (e.g., as shown) without tipping over. In some instances, contact with the rails 204 may trigger the smart cart 102 to fold, unlock the folding mechanism of the smart cart 102, and/or may merely provide support and/or guidance to the smart cart 102 when in a storage position.

In some implementations, the handle bar 304 may be coupled with the item holder 104 and a user interface device 112 may be coupled with the handle bar 304. In the illustrated example, the user interface device 112 and the handle bar 304 may move with the basket. In such instances, wiring for the user interface device 112 may pass through the handle bar 304, a rim of the item holder 104, the hinge mechanism 402, and into a support housing 108, for example, to couple with a computing device, power source, or other component of the smart cart 102.

As illustrated in FIG. 6A, a smart cart 102 may autonomously approach the cart storage rack 202. In FIG. 6B, the smart cart controller 1120 may apply a force, for example, via a motor in a hinge mechanism 402, to the basket to pivot the basket forward (e.g., when approaching the cart storage rack 202 or upon contacting the cart storage rack 202). In FIG. 6C, the support member 126 of the smart cart 102 may contact a rail 204 of the cart storage rack 202. In FIG. 6D, the smart cart 102 may move further between the rails 204 of the cart storage rack 202 and, in some implementations, fold the bottom rack 106. In FIG. 6E, the smart cart 102 may navigate forward until it contacts or nearly contacts another smart cart 102 in the cart storage rack 202, although other implementations are possible and contemplated herein.

Figure 7A:
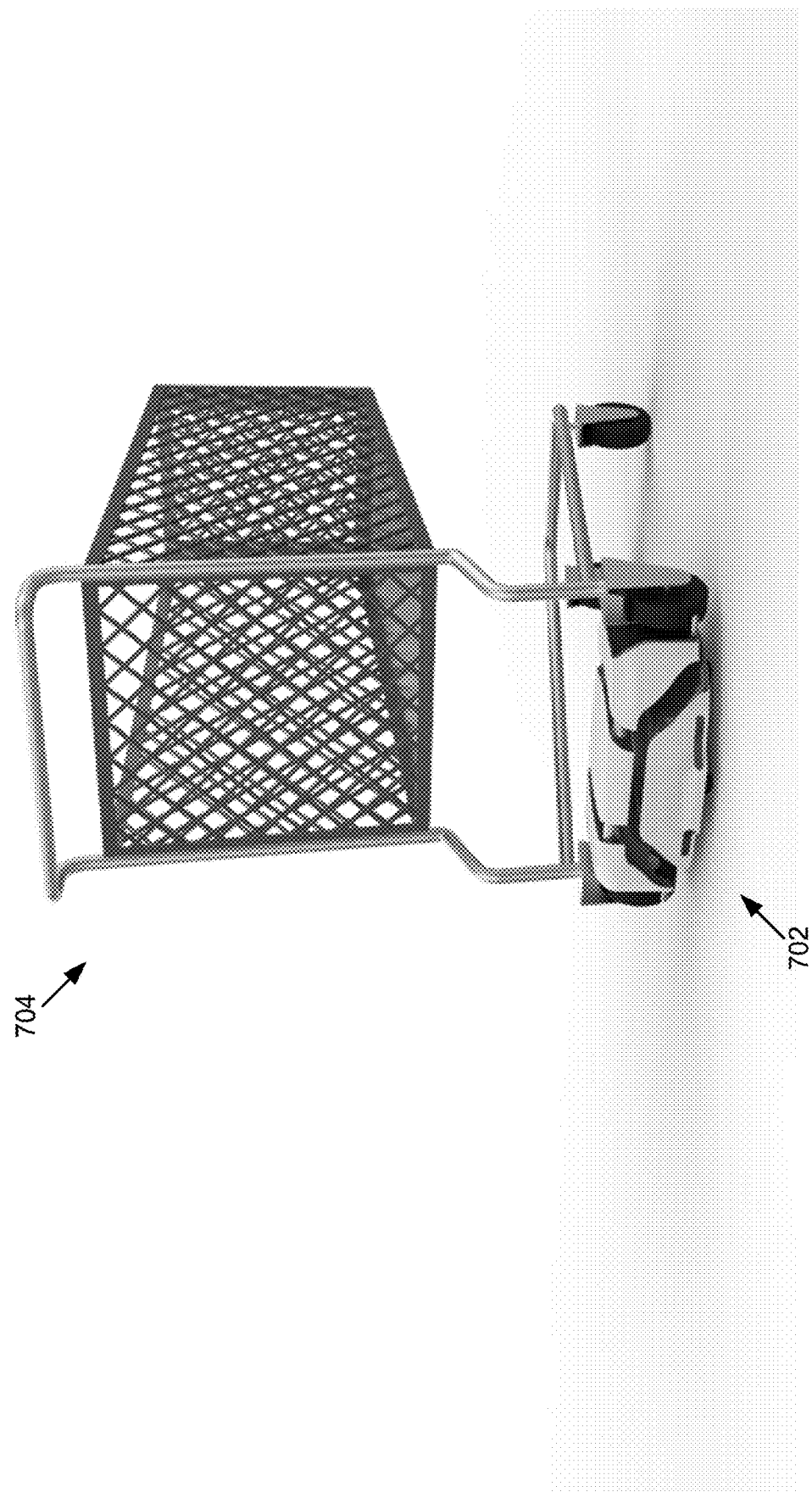
FIGS. 7A and 7B illustrate an example smart cart retrofit device coupled with a shopping cart.
Figure 7B:
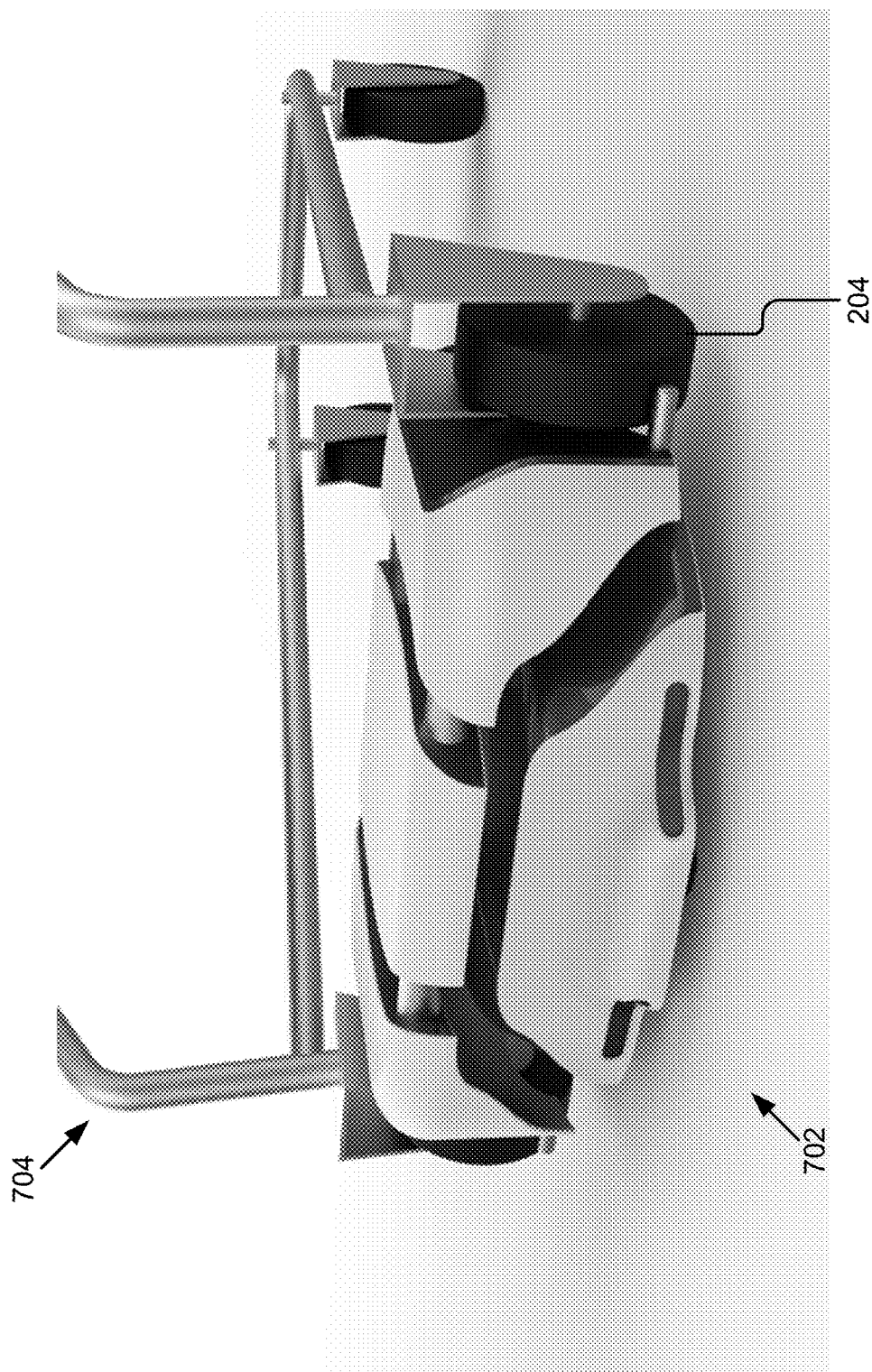

FIGS. 7A and 7B illustrate an example smart cart retrofit device 702 coupled with a shopping cart 704. As illustrated, the retrofit device 702 may couple with an existing shopping cart 704 to provide some or all of the features or functionality of the smart cart 102 described herein. The retrofit device 702 may include various motors, wheels, sensors, input/output devices, etc., for example, as described in reference to the smart cart 102.

All or a portion of the retrofit device 702 may fit underneath the shopping cart 704 and may pull or push the shopping cart 704 in the operating environment. For example, the retrofit device 702 may propel the shopping cart 704 with or without human interaction. In some implementations, the retrofit device 702 may include or couple with a user interface device, which may be attached to the shopping cart 704 or wirelessly communicate with the retrofit device 702 (e.g., a smartphone or other client device).

In some implementations, the retrofit device 702 may include one or more grasping members 802 that contact a wheel 706 of the shopping cart 704 to lift the wheel 706, thereby allowing the retrofit device 702 to provide motive force to the shopping cart 704. It should be noted that although the retrofit device 702 is illustrated as lifting rear wheels 706 of the shopping cart 704, it may additionally or alternatively couple with front wheels of the shopping cart 704, or may contact another component of the shopping cart 704. The retrofit device 702 may include other motors, sensors, and user interface devices 112, as described above in reference to the smart cart 102.

Figure 8A:
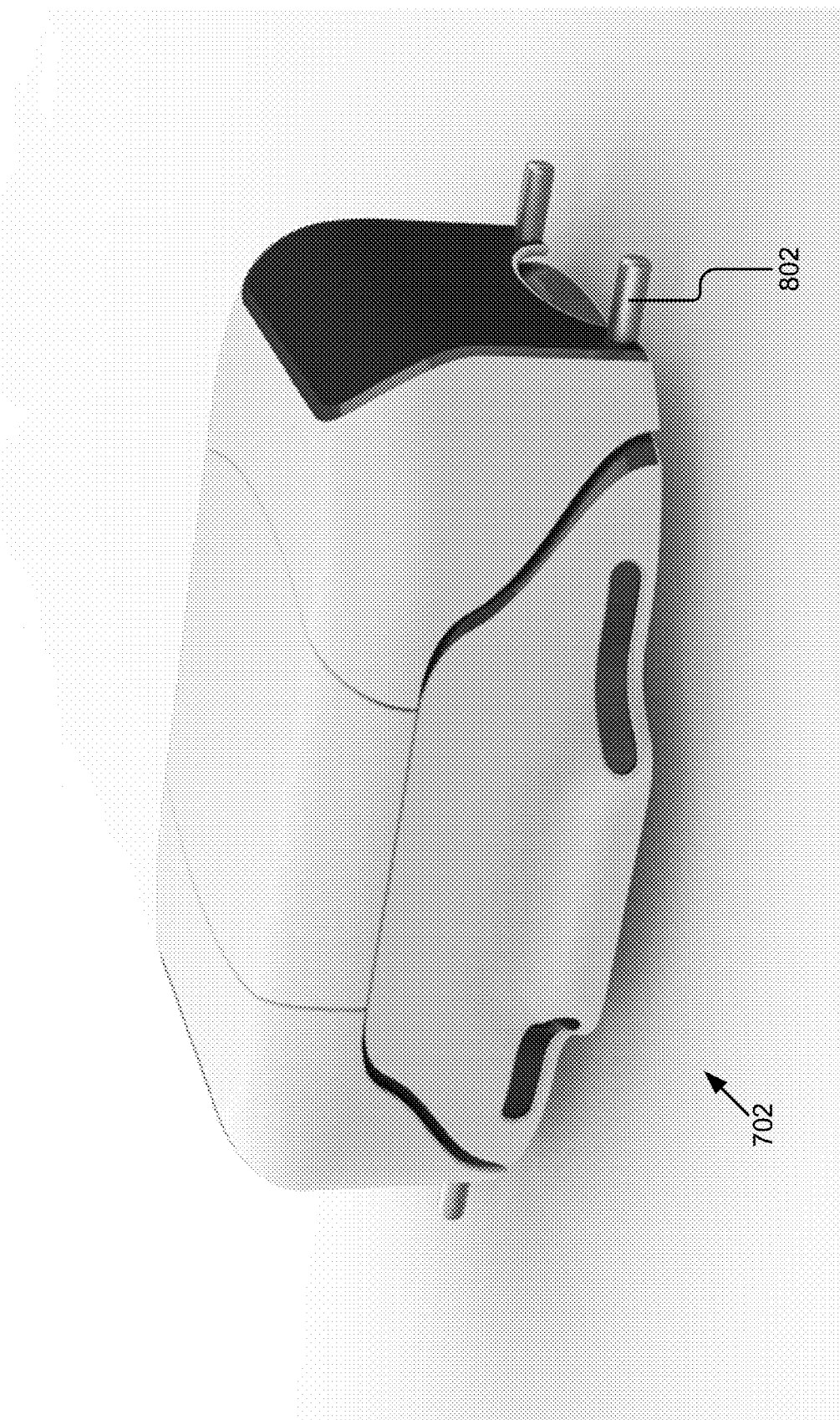
FIGS. 8A-8D are illustrations depicting an example smart cart retrofit device.
Figure 8B:
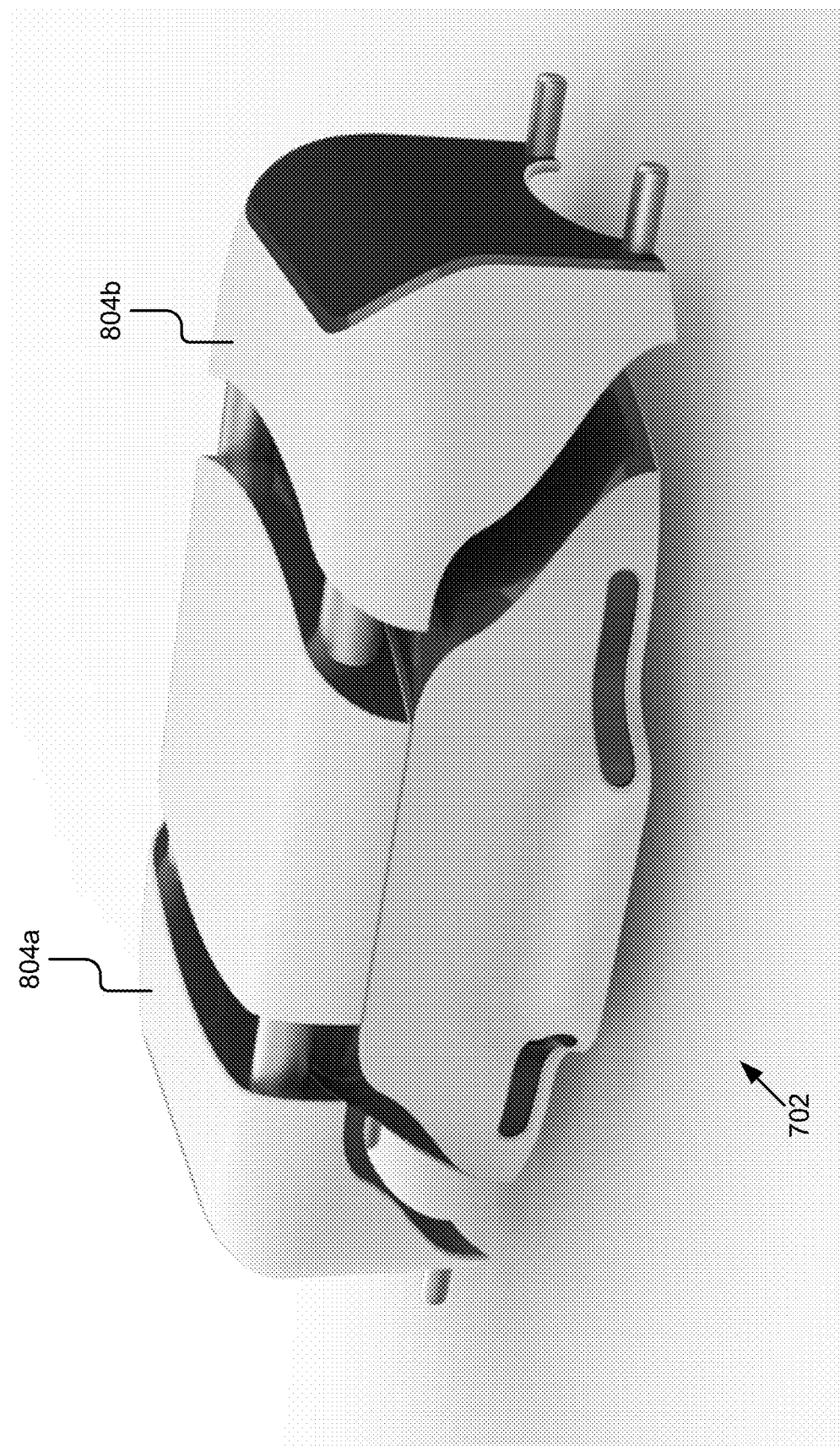
Figure 8C:
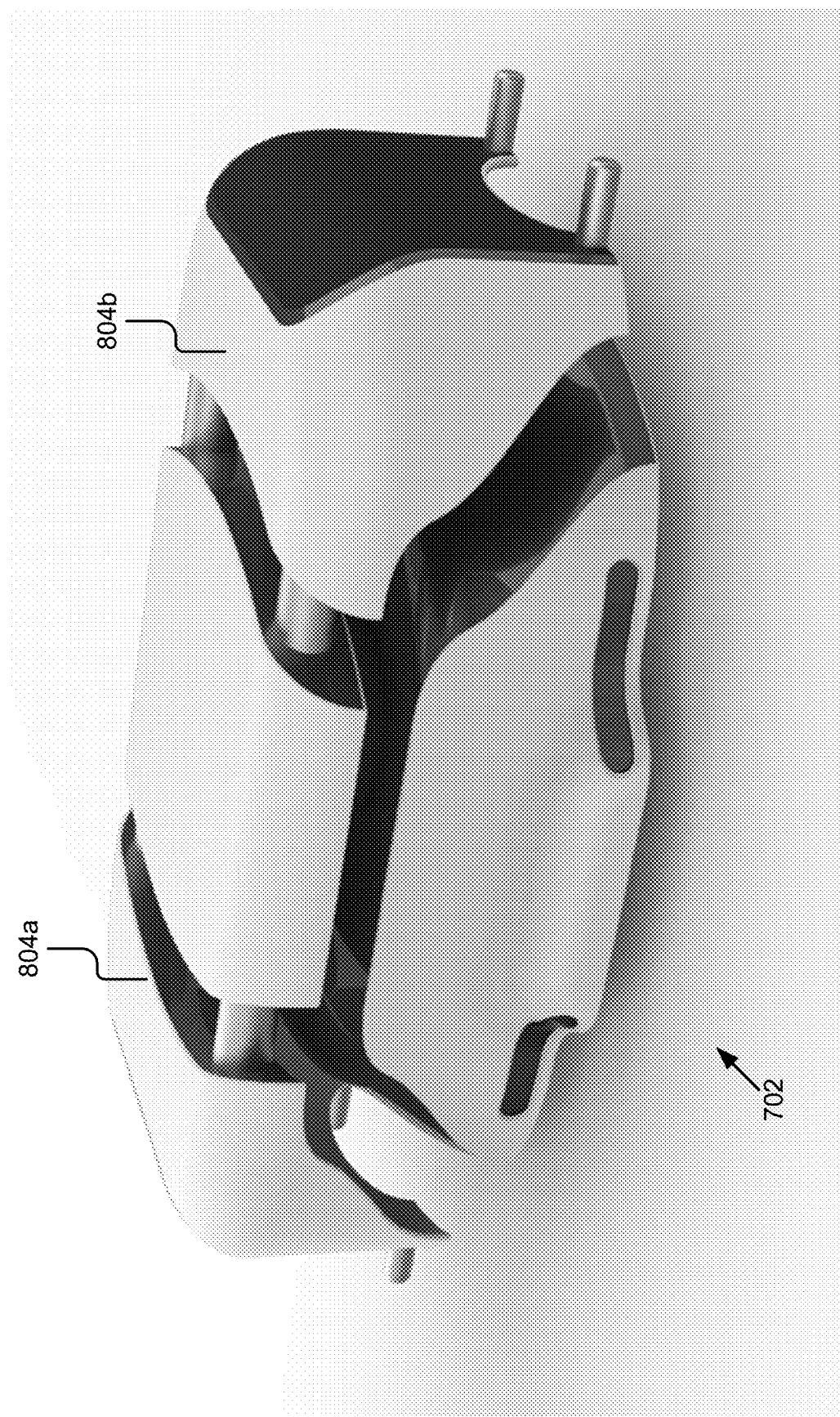
Figure 8D:
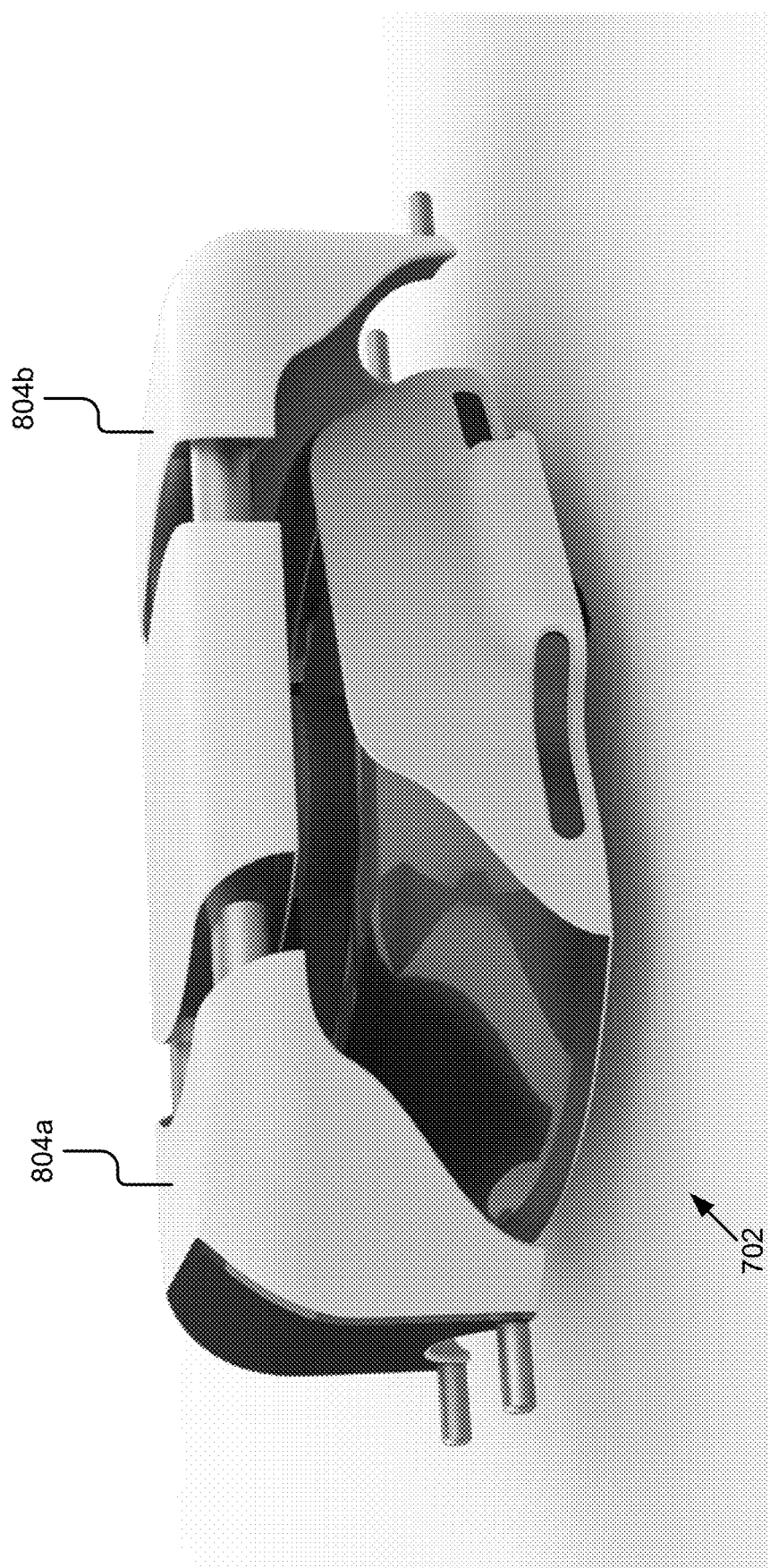

FIGS. 8A-8D are a series of illustrations depicting an example smart cart retrofit device 702 adjusting its configuration, for example, to couple with an existing shopping cart 704. As illustrated in FIG. 8A, the retrofit device 702 may have a compact shape, which may allow it to slide between the wheels 706 or underneath shopping cart 704. As illustrated in FIG. 8B, the retrofit device 702 may include motorized side supports 804a and 804b that may slide outward to fit on the sides of the wheels of the shopping cart 704 or another component of the shopping cart 704. As illustrated in FIG. 8C, the retrofit device 702 may lift itself and/or the side supports 804, which may in-turn lift the wheels of the shopping cart 704. As illustrated in FIG. 8D, the retrofit device 702 may rotate the side supports 804, for example, to correspondingly rotate a shopping cart 704 held by the side supports 804.

Figure 9:
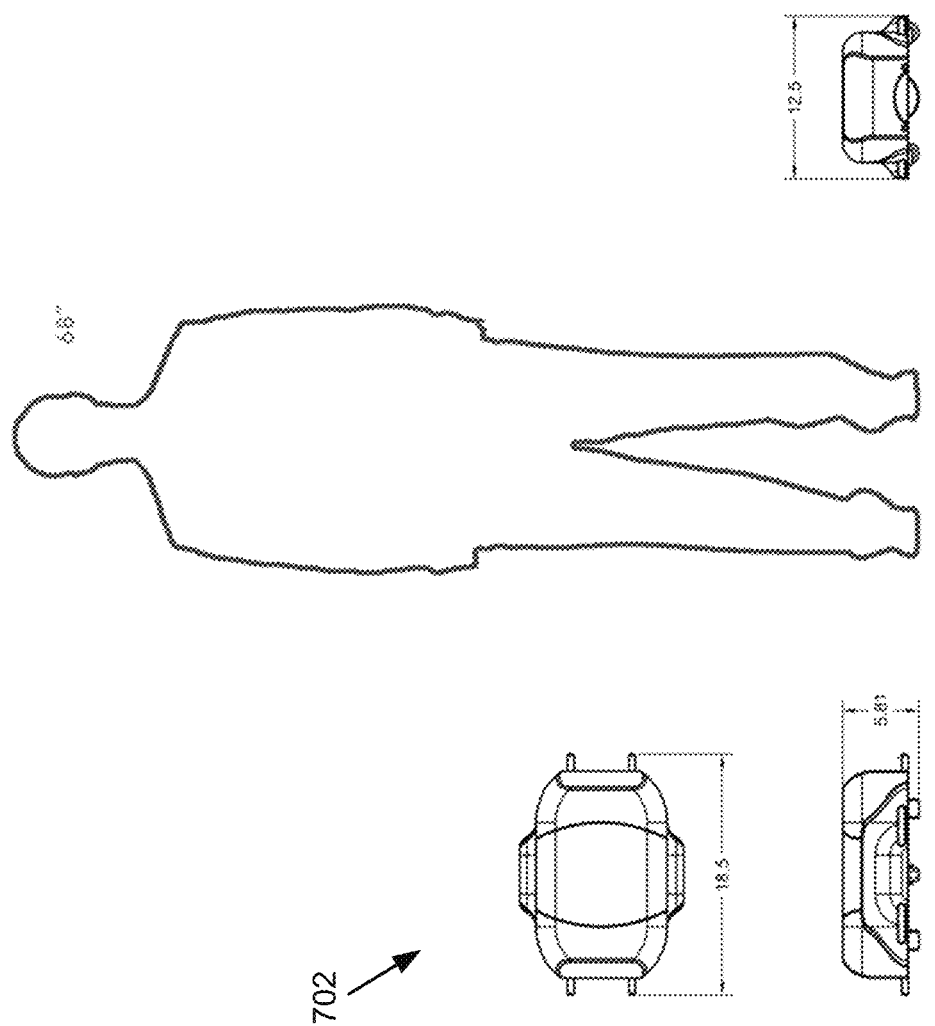
FIG. 9 illustrates example dimensions of an example smart cart retrofit device.
Figure 10A:
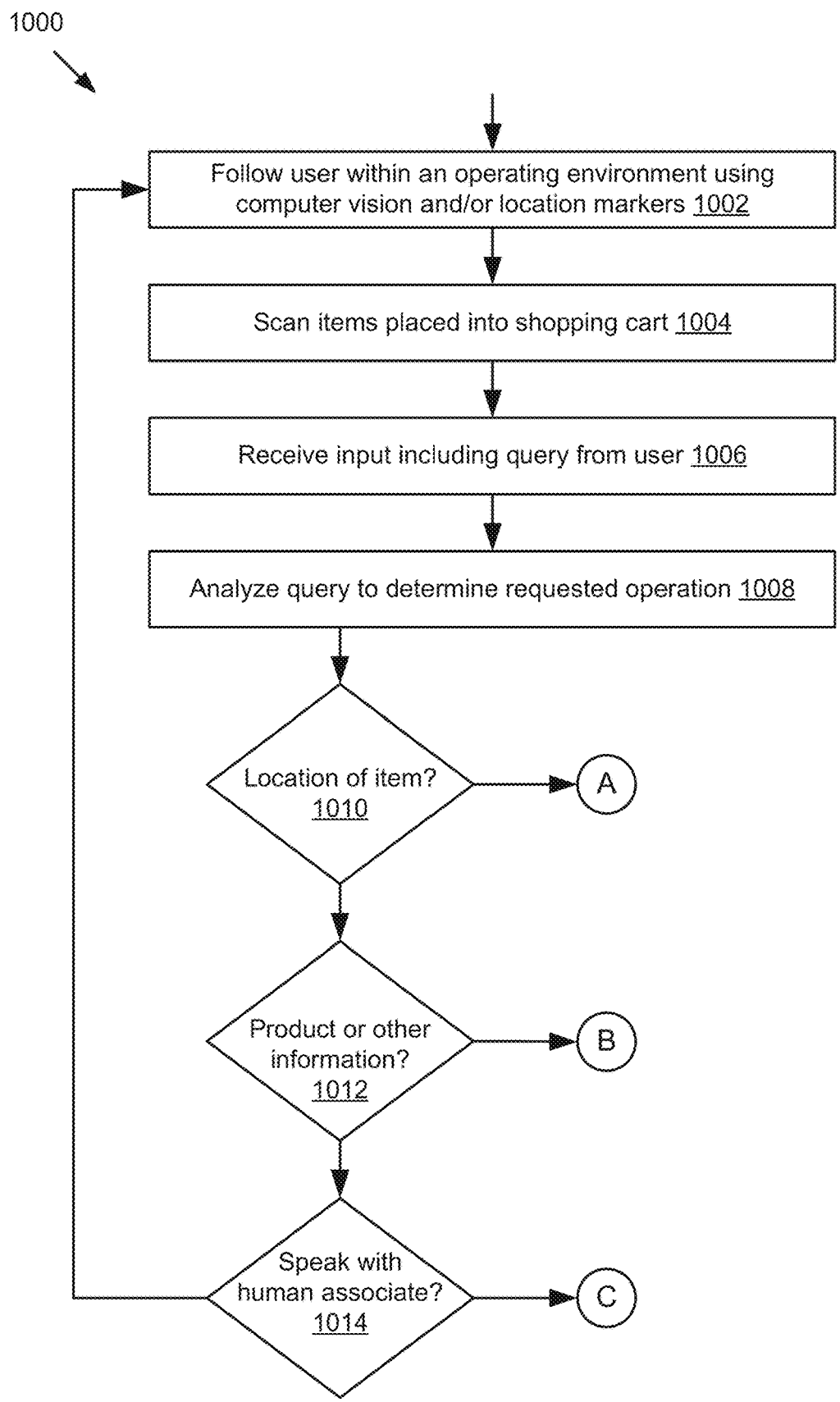
FIGS. 10A-10D are flowcharts illustrating an example method of using a smart cart.
Figure 10B:
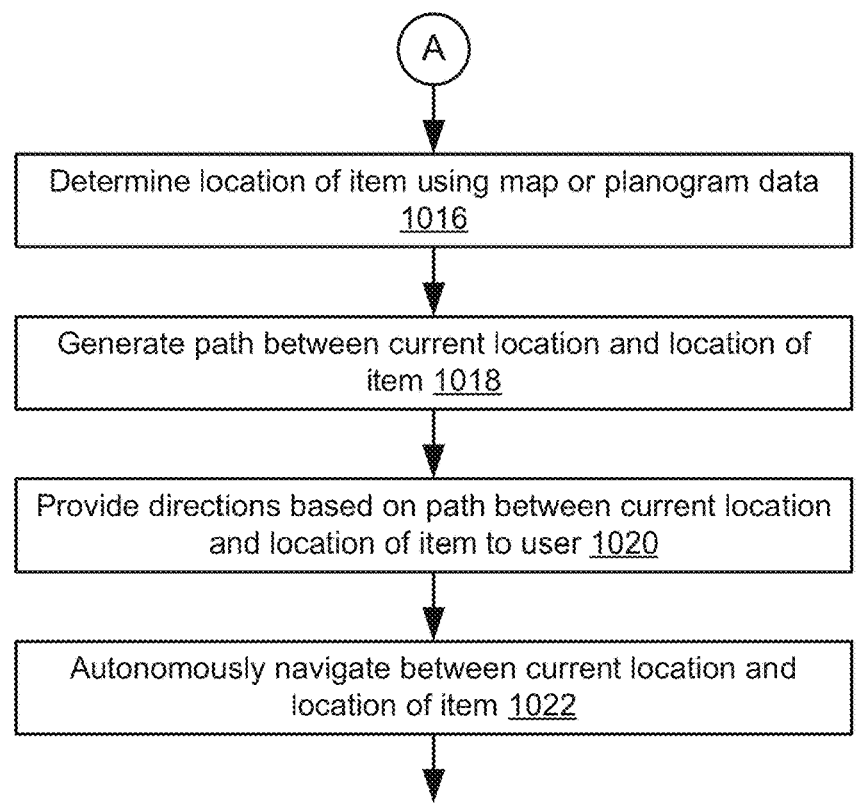
Figure 10C:
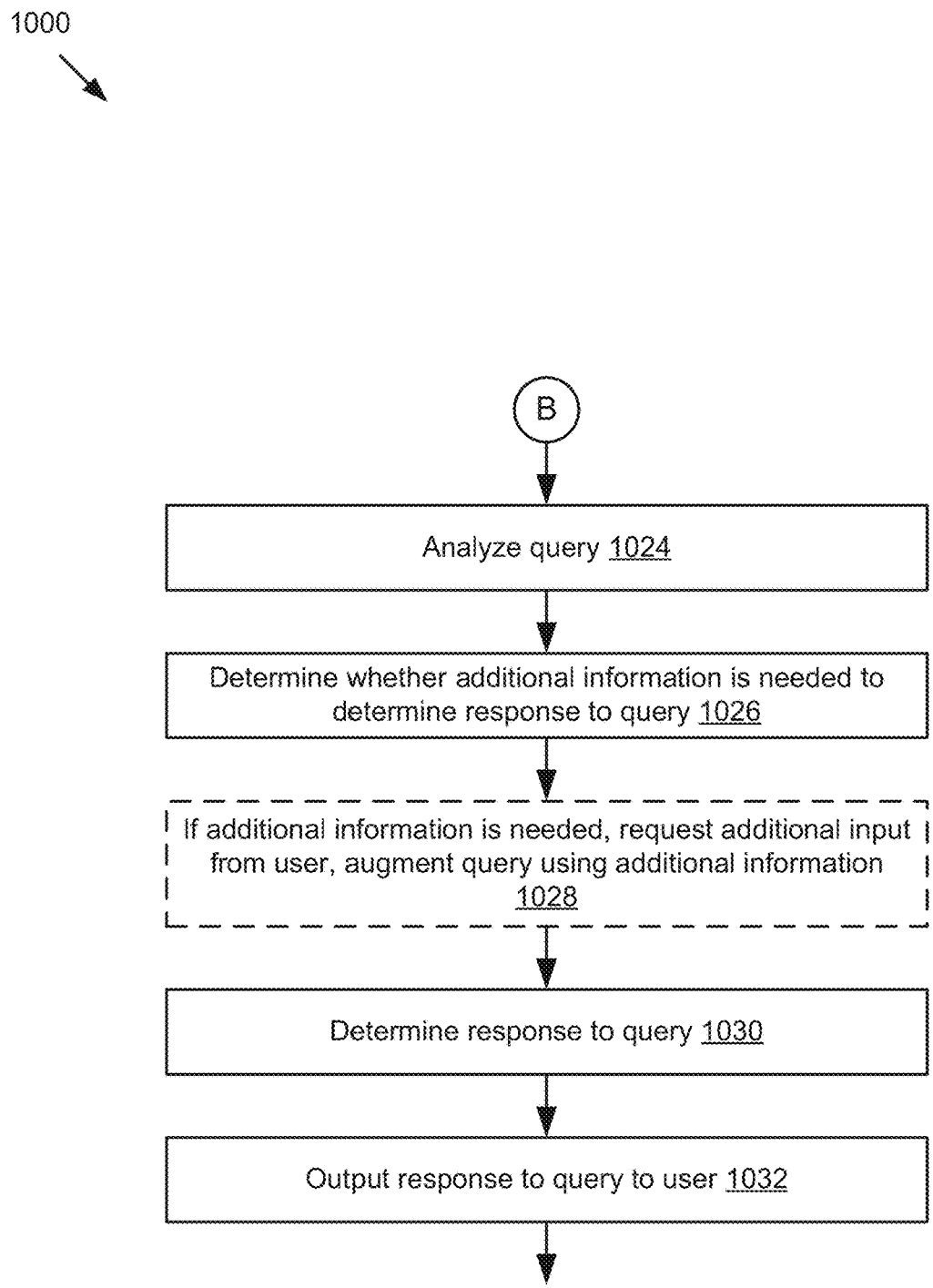
Figure 10D:
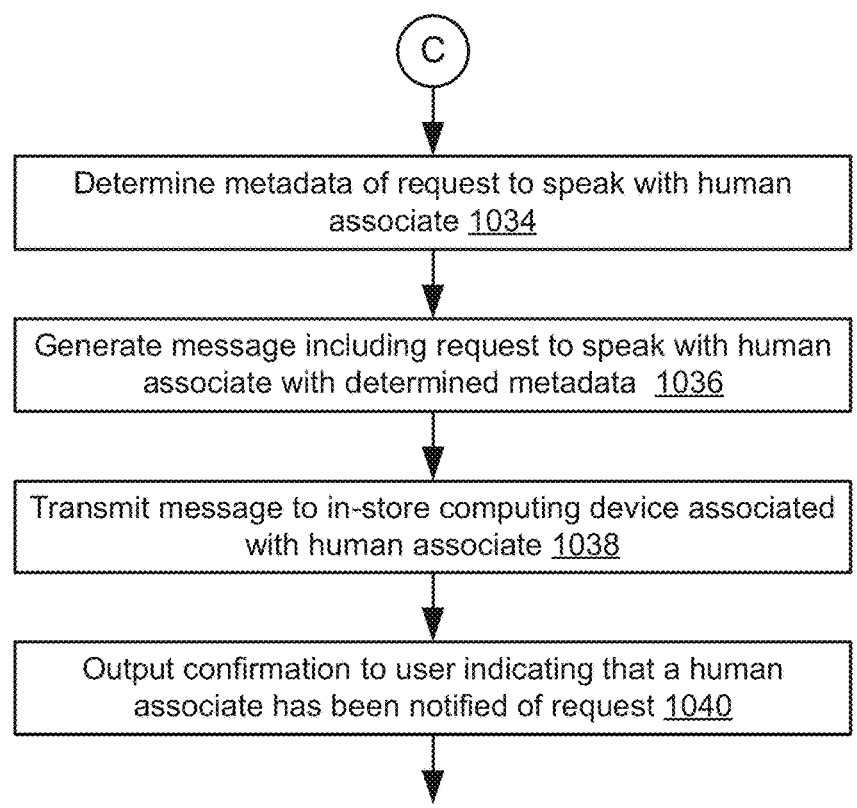

FIG. 9 illustrates example dimensions of a smart cart retrofit device 702, according to some implementations. As illustrated, the retrofit device 702 may be approximately 9 inches long, 19 inches wide, and 6 inches tall (e.g., to fit under a standard shopping cart 704). It should be noted that these dimensions are provided by way of example and other implementations are possible and contemplated.

FIGS. 10A-10D are flowcharts illustrating an example method 1000 for using a smart cart 102, for example, in a retail store environment. It should be noted that the method 1000 is provided by way of example and that some or all of the operations may be modified, removed, rearranged, etc.

In some implementations, at 1002, the smart cart controller 1120 may provide instructions to the smart cart 102 to follow user within an operating environment using the guidance system. Depending on the implementation, smart cart controller 1120 may use various markers, for example, in the operating environment in conjunction with onboard sensors. For example, the operating environment (e.g., a store, parking lot, etc.) may have markers identifying locations, paths, etc. For example, the markers may include QR codes (e.g., on the floor/ground, shelves, etc.), radio beacons, lines, etc., that assist the smart cart 102 to navigate. Additionally, or alternatively, the smart cart 102 may include cameras, sonar, etc., to avoid obstacles, track users/customers, identify markers, determine the smart cart's location in the operating environment, etc.

In some implementations, the smart cart controller 1120 may instruct a motor to provide motive force to the smart cart 102, so that the user moves within an operating environment, for example, using the location of a user. For example, the smart cart controller 1120 may identify a location of a user in an operating environment using an optical sensor coupled with the smart cart controller 1120.

In some implementations, the smart cart 102 may track the user/customer by recognizing the user (e.g., based on the user's face, clothing, etc.) and follow the user within a store. In some implementations, the smart cart 102 may track a user using a portable device that signals to the smart cart 102 an identification and/or location of the user. For example, the portable device may be a watch, wearable device, portable barcode scanner, beacon, clip, or a smartphone, etc., transmitting a signal to the smart cart 102. In some implementations, the portable device may include a barcode scanner that can be used to scan barcodes of items in the store and may transmit a signal to the smart cart 102 indicating its location and/or identification. It should be noted that these implementations are provided by way of example and other implementations are possible and contemplated, for instance, the portable device may be wirelessly or wiredly coupled with the smart cart 102.

In some implementations, as the smart cart 102 follows the user, it may maintain a defined distance from the user. In some instances, the smart cart 102 may not move unless the user moves a threshold amount. For instance, the user cart may follow the user to a section of an aisle in the store and then stay in a given location while the user walks around the aisle, places items into the cart, etc., and then, once the user has left the section of the aisle, is a threshold distance from the smart cart 102, or otherwise indicates to the smart cart 102 to move, the smart cart 102 may follow the user.

In some implementations, at 1004, the smart cart controller 1120 may scan items placed into the item holder 104 of the smart cart 102. For example, as described above, a camera, barcode scanner, RFID tag reader, etc., may track items placed into the item holder 104 and place the items on a list or virtual cart to expedite checkout. The smart cart controller 1120 may receive scan data from a scanner and identify an item based on the scan data. For example, by communicating with the server 1222.

In some implementations, at 1006, the smart cart controller 1120 may receive an input including a query from the user. For example, a user may ask for item information (e.g., "What types of printers are available in the store?" "Where are ballpoint pens located?"), item location information (e.g., "Where are the printers located?"), to speak with a human store associate, or for other information. In some instances, the input may include a scan of an item, for example, received from a scanner coupled with the user interface device 112.

In some implementations, at 1008, the smart cart controller 1120 may analyze the query to determine a requested operation. For example, the smart cart controller 1120 may transmit the input, query, scan data, etc., to a server 1222 or store computing device. For example, the smart cart controller 1120 may access a data server 1124 or data store to determine requested item information based on the query. The smart cart controller 1120 may, in response, receive information describing an attribute of the item from the server 1222 or other computing system and/or may perform other operations, for example, as described below.

In some implementations, at 1010, the smart cart controller 1120 may determine whether the query is requesting the location of an item in the operating environment of the smart cart 102 (e.g., the retail store). If the determination at 1010 is positive, the method may proceed with the operations illustrated in FIG. 10B.

In some implementations, if a requested item is unavailable in the store (e.g., out of stock, etc.), the smart cart controller 1120 may assist the user to purchase items online (e.g., via the user interface device 112), add the items to the user's virtual shopping cart or wish list, or find a comparable item available in stock in the store, for example, by communicating with a store computing system 1206 or server 1222.

In some implementations, at 1012, the smart cart controller 1120 may determine whether the query is requesting information about a product/item or other information. If the determination at 1012 is positive, the method may continue with the operations described in reference to FIG. 10C.

In some implementations, at 1014, the smart cart controller 1120 may determine whether the query indicates that the user is requesting to speak with a human associate (e.g., requesting assistance or help). If the determination at 1014 is positive, the method may continue with the operations described in reference to FIG. 10C.

In some implementations, the user interface device 112 of the smart cart 102 may assist the user to check out either directly via a display or at a point of sale in the store. In some implementations, the smart cart 102 may be allowed (or prohibited, depending on administrative settings) to exit the store and follow the user to the user's car. The smart cart 102 may track items removed from the smart cart 102 or receive input from the user indicating that the user is done with the smart cart 102 and the smart cart 102 may automatically return to the store from the parking lot. The navigation of the cart may be performed using the guidance system, for example, GPS, markers in the parking lot, beacons, machine vision, etc., as described above.

In some implementations, at 1016, the smart cart controller 1120 may determine a location of the item using map or planogram data. For example, the smart cart controller 1120 may retrieve map and/or planogram data identifying the location (e.g., in an operating environment of the smart cart 102) of a requested item in the particular store from a database coupled with a store computing system 1206 or server 1222.

In some implementations, at 1018, the smart cart controller 1120 may determine the current location of the smart cart 102 in an operating environment and may generate a path between the current location and a location of the item in the operating environment.

In some implementations, at 1020, the smart cart controller 1120 may provide directions based on the path between the current location and the location of the item to the user. The directions may be provided to the user via a user interface device 112, for example a display, audio output device, the user's smartphone (e.g., sent to an application on the smartphone), or by, for example, guiding the wheels of the smart cart 102 as the user pushes or follows the smart cart 102 through the store (e.g., the wheels may be selectively propelled, braked, or turned to guide the cart through the store as navigation directions are provided).

In some implementations, the smart cart controller 1120 may request input from the user and receive, by the user interface device 112, input confirming to navigate to the location of the item in the operating environment. For instance, the user interface device 112 may display options to the user including whether the smart cart 102 should follow the user, navigate autonomously, or provide directions to the user (e.g., by turning wheels, braking wheels, displaying directions on a display, outputting audible directions, etc.).

In some implementations, at 1022, the smart cart controller 1120 may cause the smart cart 102 to autonomously navigate between the current location and the location of the item in the operating environment, for instance, based on the determined path. For instance, the smart cart 102 may follow the user, lead the user, provide directions to the user, etc., to the location of the item using a motor and guidance system coupled with the smart cart controller 1120.

For instance, the guidance system may include one or more sensors that detect and process navigation markers (e.g., QR codes, RFID labels, etc.) to locate the smart cart 102 as the smart cart 102 traverses the operating environment. The guidance system may be coupled to a smart cart controller 1120, which may, in some instances, include local object detection intelligence and processing to avoid collision with other objects (e.g., AGVs, humans, items, storage shelving units, etc.) in the operating environment.

In some implementations, at 1024, the smart cart controller 1120 may analyze the query to determine what information is requested and/or identify a product/item about which information is requested. For example, the analysis may use decision trees, keywords, or conversational AI to analyze the query.

In some implementations, at 1026, the smart cart controller 1120 may determine whether additional information is needed to determine a response to the query. For example, if the smart cart controller 1120 cannot determine an answer or cannot determine a result with a threshold level of certainty, the smart cart controller 1120 may determine that additional information is required. For example, if a user requests information about an item, but the request does not include enough information to resolve a specific item, additional information may be needed.

At 1028, the smart cart controller 1120 may, if additional information is needed (e.g., the determination at 1026 is positive), request additional input from the user, for example, by outputting a question requesting clarification or additional information to the user. In some instances, the smart cart controller 1120 may use the user's response with additional information or clarification to augment the query. For example, if the user requests reviews about a printer, the smart cart controller 1120 may request clarification about a make or model of the printer, type of printer, price range, etc., to narrow search results to a threshold level.

In some implementations, at 1030, the smart cart controller 1120 may determine a response to the query, and, at 1032, the smart cart controller 1120 may output the response to the query to the user via audio or visual output using the user interface device 112 or a device of the user (e.g., a smart phone, etc.). For instance, the smart cart controller 1120 may provide a graphical interface including a virtual shopping cart on the user interface device 112, the virtual shopping cart displaying the information describing an attribute of the item.

In some implementations, the smart cart controller 1120 may receive, by the user interface device 112, input from a user indicating to purchase the item and, in response, transmit data describing the input to the server 1222 to facilitate a purchase of the item. In some instances, the smart cart controller 1120 may receive confirmation from the server 1222 that the item has been successfully purchased. The smart cart controller 1120 or server 1222 may, in some instances, transmit a message indicating that the item has been purchased to a store computing system 1206 associated with the smart cart 102, so that a user may freely exit the store with the purchased items. In some implementations, when the items in the cart are successfully purchased, the smart cart controller 1120 may permit the smart cart 102 to exit the store (e.g., by allowing the wheels of the cart to turn, preventing an alarm, etc.). On the other hand, if any items in the cart have not yet been purchased, the smart cart 102 may not navigate from the store, for example, it may navigate to a point-of-sale check out or customer service counter, lock its wheels at the store exit, or alert a store associate that checkout of items in the cart is not yet complete (e.g., upon a user attempting to cross a boundary in the store).

In some implementations, at 1034, the smart cart controller 1120 may determine metadata of the request to speak with the human associate. For example, the metadata may indicate the location of the user and/or smart cart 102, an identification of the item for which a user was searching or that was scanned by the smart cart 102's scanner, diagnostic or status information of the smart cart 102, or other information.

In some implementations, at 1036, the smart cart controller 1120 may generate a message including the request to speak with the human associate and the metadata, and, at 1038, the smart cart controller 1120 may transmit the message to a store computing system 1206 (e.g., the messaging module 1122) associated with a smart cart 102 and/or human worker. In some implementations, at 1040, the smart cart controller 1120 may output a confirmation notification (e.g., via a display or speaker) to the user indicating that a human worker or store associate has been notified of the request.

Methods and systems are described herein; however, it should be understood that the methods and systems are provided by way of example, and that variations and combinations of these methods and systems, as well as other methods and systems, are contemplated. For example, in some embodiments, at least a portion of one or more of the methods and systems represent various segments of one or more, larger methods or systems and may be concatenated or various steps of these methods and systems may be combined to produce other methods and systems which are encompassed by the present disclosure. Additionally, it should be understood that various operations in the methods may in some cases be iterative, and thus repeated as many times as necessary generate the results described herein. Further the ordering of the operations in the methods is provided by way of example and it should be understood that various operations may occur earlier and/or later in the method without departing from the scope thereof.

Figure 11:
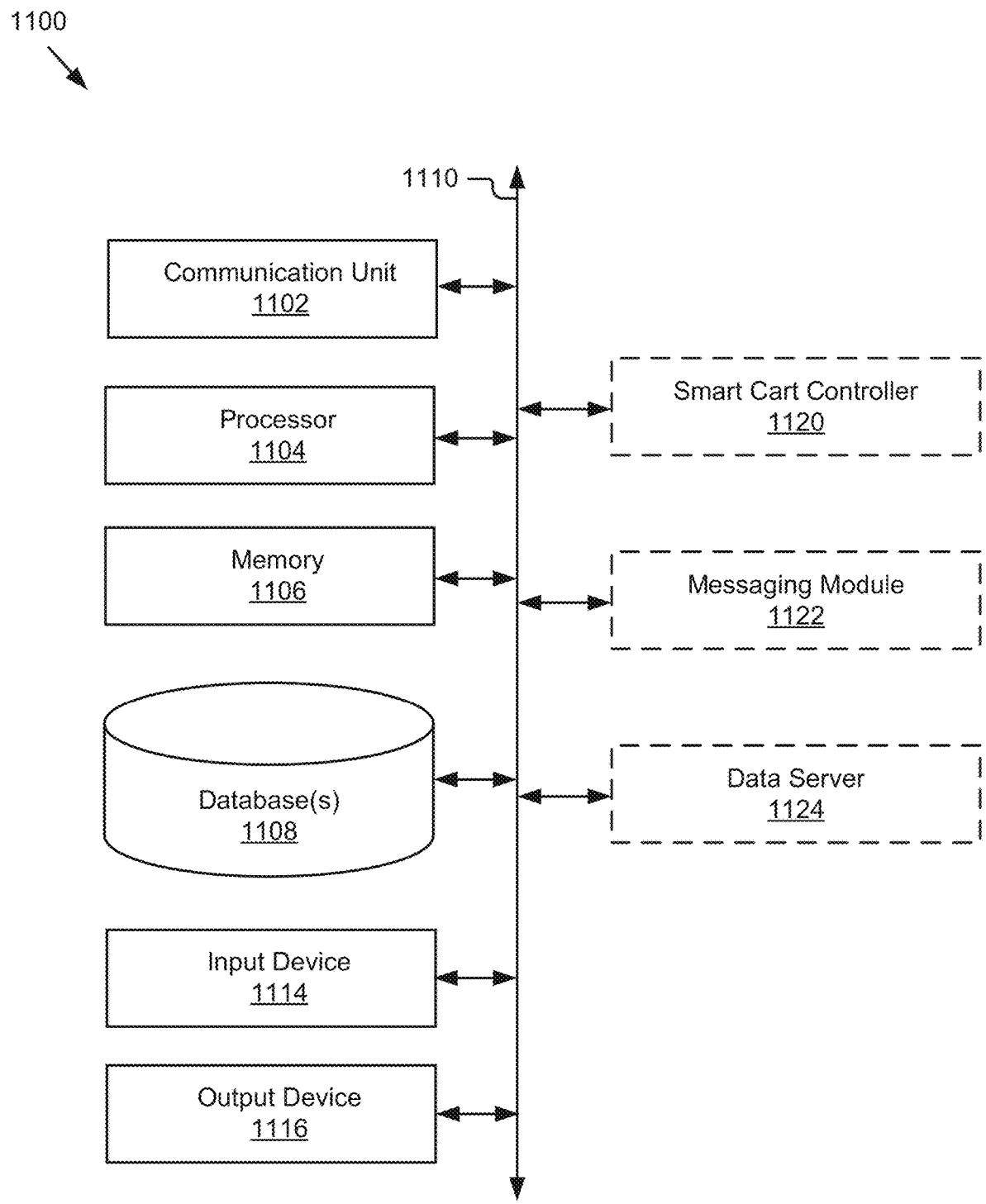
FIG. 11 is a block diagram of an example computing device.

FIG. 11 is a block diagram of an example computing device 1100 for executing code and routines according to the technology described herein.

Figure 12:
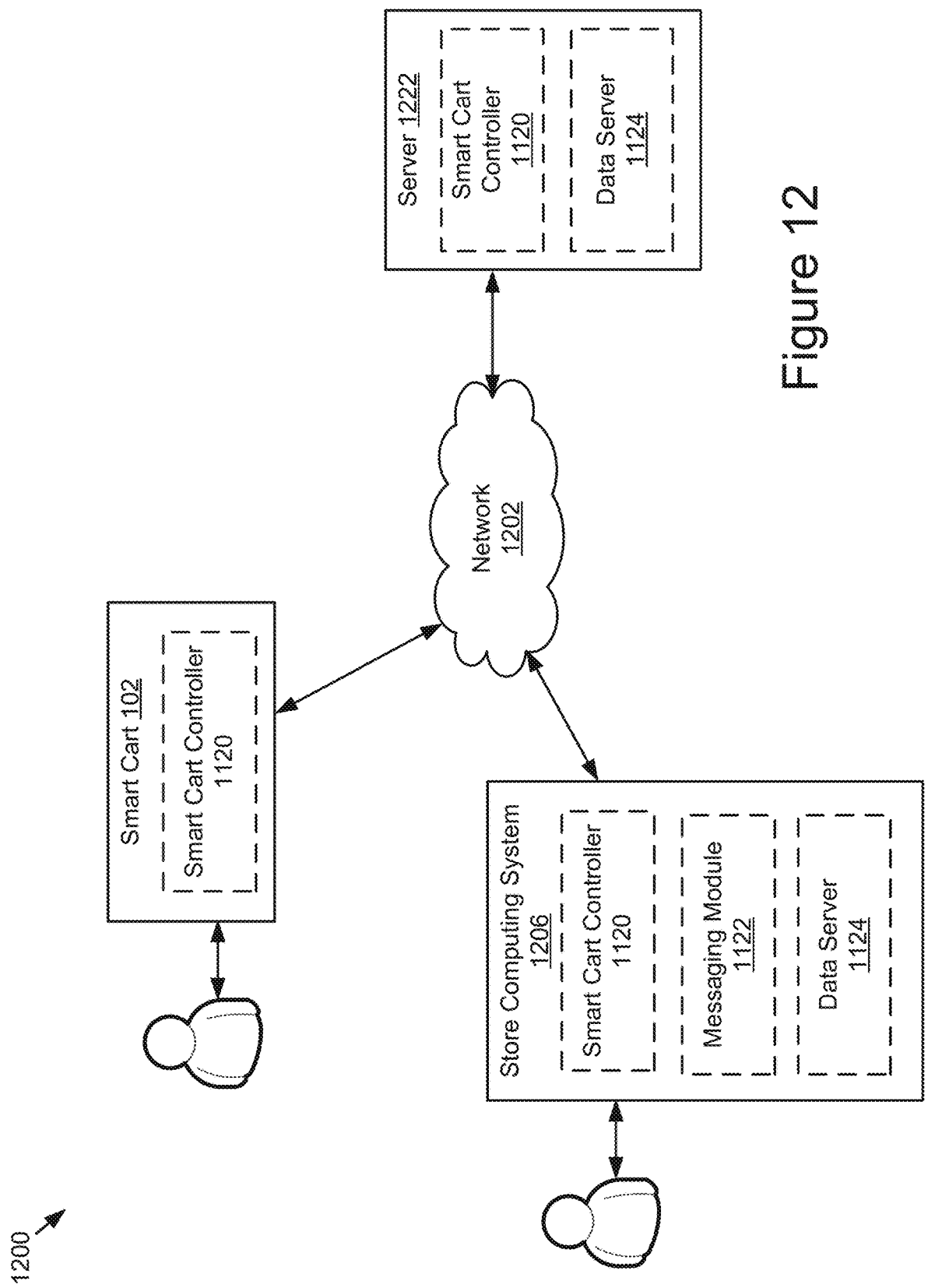
FIG. 12 is a block diagram of an example system for enabling smart features of a smart cart.

This computing system 1100 may represent the computer architecture of a smart cart 102, store computing system 1206, or a server 1222, for example, as depicted in FIG. 12, and may include different components depending on the implementation being represented.

As depicted in FIG. 11, the computing system 1100 may include one or more of a smart cart controller 1120, messaging module 1122, and data server 1124, depending on the configuration. It should be understood that other configurations are also possible, such as where the components 1120, 1122, and/or 1124 are combined into a single entity or further distributed into additional components.

The data server 1124 includes computer logic executable by the processor 1104 to receive, process, and respond to content requests. The data server 1124 may include an HTTP server, a REST (representational state transfer) service, or other suitable server type. The data server 1124 may receive content requests (e.g., page requests, order requests, other requests (e.g., HTTP), etc.) from devices, cooperate with the smart cart controller 1120 to determine the content, retrieve and incorporate data from the database(s) 1108, format the content, and provide the content to the devices (e.g., smart carts 102). In some instances, the data server 1124 may format the content using a web language and provide the content to a corresponding smart cart controller 1120 for processing and/or rendering to the user for display, although other variations are also possible.

The data server 1124 may be coupled with or stored on the database(s) 1108 to store retrieve, and/or manipulate data stored therein and may be coupled to other components or servers to facilitate their operations.

The smart cart controller 1120 may include computer logic executable by the processor 1104 to control one or more aspects of the smart cart 102, user interface device 112, commerce experience, etc., and provide the operations described herein. The smart cart controller 1120 may include software including logic executable by the processor 1104 to perform the acts described herein, although, in further embodiments, the smart cart controller 1120 may be implemented in hardware (one or more application specific integrated circuits (ASICs) coupled to the bus 1110 for cooperation and communication with the other components of the system 1100; sets of instructions stored in one or more discrete memory devices (e.g., a PROM, FPROM, ROM) that are coupled to the bus 1110 for cooperation and communication with the other components of the system 1100; a combination thereof; etc.).

The messaging module 1122 may include computer logic executable by the processor 1104 on a store computing system 1206 to provide for user interaction, receive user input, present information to the user via a display, and send data to and receive data from the other entities of the system 1200 via the network 1202. For instance, the messaging module 1122 may receive messages from smart carts 102 and display the messages to store associates. For instance, the messages may request that a user speak with a store associate, or may facilitate self or automated checkout, as described in further detail above.

As depicted, the computing system 1100 may include a processor 1104, a memory 1106, a communication unit 1102, an output device 1116, an input device 1114, and database(s) 1108, which may be communicatively coupled by a communication bus 1110. The computing system 1100 depicted in FIG. 11 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 1100 may include various operating systems, sensors, additional processors, and other physical configurations. Although, for purposes of clarity, FIG. 11 only shows a single processor 1104, memory 1106, communication unit 1102, etc., it should be understood that the computing system 1100 may include a plurality of one or more of these components.

The processor 1104 may execute software instructions by performing various input, logical, and/or mathematical operations. The processor 1104 may have various computing architectures to process data signals including, for example, a complex instruction set computer (CISC) architecture, a reduced instruction set computer (RISC) architecture, and/or an architecture implementing a combination of instruction sets. The processor 1104 may be physical and/or virtual, and may include a single core or plurality of processing units and/or cores. In some implementations, the processor 1104 may be capable of generating and providing electronic display signals to a display device, supporting the display of images, capturing and transmitting images, performing complex tasks including various types of feature extraction and sampling, etc. In some implementations, the processor 1104 may be coupled to the memory 1106 via the bus 1110 to access data and instructions therefrom and store data therein. The bus 1110 may couple the processor 1104 to the other components of the computing system 1100 including, for example, the memory 1106, the communication unit 1102, the input device 1114, the output device 1116, and the database(s) 1108.

The memory 1106 may store and provide access to data to the other components of the computing system 1100. The memory 1106 may be included in a single computing device or a plurality of computing devices. In some implementations, the memory 1106 may store instructions and/or data that may be executed by the processor 1104. For example, the memory 1106 may store one or more of the components 1120, 1122, and 1124, and their respective components, depending on the configuration. The memory 1106 is also capable of storing other instructions and data, including, for example, an operating system, hardware drivers, other software applications, databases, etc. The memory 1106 may be coupled to the bus 1110 for communication with the processor 1104 and the other components of computing system 1100.

The memory 1106 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 1104. In some implementations, the memory 1106 may include one or more of volatile memory and non-volatile memory (e.g., RAM, ROM, hard disk, optical disk, etc.). It should be understood that the memory 1106 may be a single device or may include multiple types of devices and configurations.

The bus 1110 can include a communication bus for transferring data between components of a computing device or between computing devices, a network bus system including the network 1202 or portions thereof, a processor mesh, a combination thereof, etc. In some implementations, the components operating on the computing system 1100 (operating systems, device drivers, etc.) may cooperate and communicate via a communication mechanism included in or implemented in association with the bus 1110. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 1102 may include one or more interface devices (I/F) for wired and wireless connectivity among the components of the system 1200. For instance, the communication unit 1102 may include various types known connectivity and interface options. The communication unit 1102 may be coupled to the other components of the computing system 1100 via the bus 1110. The communication unit 1102 may be electronically communicatively coupled to the network 1202 (e.g., wiredly, wirelessly, etc.). In some implementations, the communication unit 1102 can link the processor 1104 to the network 1202, which may in turn be coupled to other processing systems. The communication unit 1102 can provide other connections to the network 1202 and to other entities of the system 1200 using various standard communication protocols.

The input device 1114 may include any device for inputting information into the computing system 1100. In some implementations, the input device 1114 may include one or more peripheral devices. For example, the input device 1114 may include a keyboard, a pointing device, microphone, an image/video capture device (e.g., camera), a touch-screen display integrated with the output device 1116, etc.

The output device 1116 may be any device capable of outputting information from the computing system 1100. The output device 1116 may include one or more of a display (LCD, OLED, etc.), a printer, a haptic device, audio reproduction device, touch-screen display, etc. In some implementations, the output device is a display which may display electronic images and data output by the computing system 1100 for presentation to a user. In some implementations, the computing system 1100 may include a graphics adapter (not shown) for rendering and outputting the images and data for presentation on output device 1116. The graphics adapter (not shown) may be a separate processing device including a separate processor and memory (not shown) or may be integrated with the processor 1104 and memory 1106.

The database(s) 1108 are information source(s) for storing and providing access to data. The data stored by the database(s) 1108 may be organized and queried using various criteria including any type of data stored by them, such as a customer identifier, business identifier, order ID, IP address, rewards account number, item identifier, item attributes, item name, map data, planogram data, cart data, etc. The database(s) 1108 may include file systems, data tables, documents, databases, or other organized collections of data. Examples of the types of data stored by the database(s) 1108 may include invoice data, item data, business account data, purchase data, user profile data, etc.

The components of the computing system 1100 may be communicatively coupled by the bus 1110 and/or the processor 1104 to one another. In some implementations, the components 1120, 1122, and/or 1124 may include computer logic (e.g., software logic, hardware logic, etc.) executable by the processor 1104 to provide their acts and/or functionality. In any of the foregoing implementations, these components 1120, 1122, and/or 1124 may be adapted for cooperation and communication with the processor 1104 and the other components of the computing system 1100.

The database(s) 1108 may be included in the computing system 1100 or in another computing system and/or storage system distinct from but coupled to or accessible by the computing system 1100. The database(s) 1108 can include one or more non-transitory computer-readable mediums for storing the data. In some implementations, the database(s) 1108 may be incorporated with the memory 1106 or may be distinct therefrom. In some implementations, the database(s) 1108 may store data associated with a database management system (DBMS) operable on the computing system 1100. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

FIG. 12 is a block diagram of an example system for enabling smart features of a smart cart 102 according to some implementations. The illustrated system 1200 may include a smart cart 102, a store computing system 1206, and/or a server 1222, which are electronically communicatively coupled via a network 1202 for interaction with one another, although other system configurations are possible including other devices, systems, and networks. For example, the system 1200 could include any number of smart carts 102, store computing systems 1206, servers 1222, and other systems and devices.

The network 1202 may include any number of networks and/or network types. For example, the network 1202 may include one or more local area networks (LANs), wide area networks (WANs) (e.g., the Internet), virtual private networks (VPNs), wireless wide area network (WWANs), WiMAX® networks, personal area networks (PANs) (e.g., Bluetooth® communication networks), various combinations thereof, etc. These private and/or public networks may have any number of configurations and/or topologies, and data may be transmitted via the networks using a variety of different communication protocols including, for example, various Internet layer, transport layer, or application layer protocols. For example, data may be transmitted via the networks using TCP/IP, UDP, TCP, HTTP, HTTPS, DASH, RTSP, RTP, RTCP, VOIP, FTP, WS, WAP, SMS, MMS, XMS, IMAP, SMTP, POP, WebDAV, or other known protocols.

The store computing system 1206 may include one or more computing devices having data processing and communication capabilities. The store computing system 1206 may couple to and communicate with other entities of the system 1200 via the network 1202 using a wireless and/or wired connection.

As illustrated, in some implementations, the components of the system 1200 may communicate via the network 1202. For instance, the smart cart 102 may transmit data to and receive data from a data server 1124 operable on a store computing system or server to determine item information, purchase items, and perform other functionality described herein.

It should be understood that the system 1200 illustrated in FIG. 12 is representative of an example system for implementing a smart cart, and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A smart cart system comprising:
a cart including:
  a frame, and
  an item holder supported by the frame, the cart configured to transition between an open position and a storage position, the storage position being a more compact position than the open position when the cart is stored with one or more second carts, the item holder nesting with one or more second item holders of the one or more second carts when the item holder is in the storage position;
a motivator coupled to the frame and configured to provide a motive force to propel the cart in an operating environment;
a power source attached to the cart and coupled to a computing device and the motivator to provide power;
a charging interface attached to the frame of the cart, the charging interface configured to interact with a cart charging system of a cart storage rack to charge the power source when the item holder is nested with the one or more second item holders of the one or more second carts;
a user interface device;
the computing device attached to cart and coupled to the user interface device and the motivator; and
a smart cart controller operable on the computing device and configured to perform operations including:
  receiving information describing an attribute of an item, and
  providing the information describing the attribute of the item for presentation by the user interface device.

2. The smart cart system of claim 1, wherein:
the frame includes a support housing,
the cart includes a hinge mechanism coupling the item holder with the support housing, and
transitioning the item holder into the storage position includes pivoting the item holder using the hinge mechanism to position the item holder into the storage position, the storage position being a nesting position in which the cart is configured to nest with the one or more second item holders of the one or more second carts.

3. The smart cart system of claim 2, wherein:
the hinge mechanism includes a motor, and
the smart cart controller is configured to instruct the motor to apply force to the hinge mechanism that causes the item holder to transition between the open position and the storage position.

4. The smart cart system of claim 1, wherein:
the frame includes a first support housing and a second support housing,
the first support housing is affixed to a cross beam at a first end of the cross beam and the second support housing is affixed to the cross beam at a second end of the cross beam, and
the cross beam provides vertical support to the item holder when items are loaded into the item holder, the item holder pivoting away from the cross beam when the item holder transitions into the storage position.

5. The smart cart system of claim 1, wherein:
the frame includes a first support housing positioned at a first side of the item holder and a second support housing positioned at a second side of the item holder, and
the power source includes a battery housed within one or more of the first support housing and the second support housing.

6. The smart cart system of claim 5, wherein:
the motivator includes one or more motors,
the first support housing holds a first motor of the one or more motors, the first motor coupled with a first wheel,
the second support housing holds a second motor of the one or more motors, the second motor coupled with a second wheel, and
the smart cart controller selectively drives the first motor and the second motor to provide the motive force to the cart.

7. The smart cart system of claim 1, wherein:
the cart includes a handle bar coupled with one or more of the item holder and the frame, and
the user interface device includes a touch screen display coupled with the handle bar, the touch screen display receiving user input and displaying the information describing the attribute of the item.

8. The smart cart system of claim 7, wherein:
the handle bar is coupled with the item holder and is configured to move with the item holder when the item holder transitions to the storage position.

9. The smart cart system of claim 1, wherein the operations include:
identifying a location of a user in the operating environment using an optical sensor coupled with the smart cart controller, and
instructing the motivator to provide the motive force to the cart to follow the user as the user moves within the operating environment using the location of the user.

10. The smart cart system of claim 1, wherein:
the smart cart controller is communicatively coupled with a scanner, and
the operations include receiving scan data from the scanner and identifying the item based on the scan data.

11. The smart cart system of claim 10, wherein the operations include:
capturing the scan data including one or more of a bar code, a QR (quick response) code, and an image of the item using the scanner,
transmitting the captured scan data to a server and, in response, receiving the information describing the attribute of the item from the server, and
providing a graphical interface including a virtual shopping cart on the user interface device, the virtual shopping cart displaying the information describing the attribute of the item.

12. The smart cart system of claim 11, wherein the operations include:
receiving, by the user interface device, input from a user indicating to purchase the item and, in response, transmitting data describing the input to the server to facilitate a purchase of the item,
receiving confirmation from the server that the item has been successfully purchased, and
transmitting a message indicating that the item has been purchased to a store computing system associated with the smart cart system.

13. The smart cart system of claim 1, wherein the operations include:
determining a location of the item in the operating environment associated with the smart cart system,
determining a current location of the cart in the operating environment,
determining a path from the current location of the cart to the location of the item in the operating environment,
receiving input confirming to navigate to the location of the item in the operating environment, and
navigating the cart to the location of the item using the determined path, the motivator, and a guidance system communicatively coupled with the smart cart controller.

14. The smart cart system of claim 1, wherein the operations include:
receiving, by the user interface device, a request for help,
determining metadata associated with the request, the metadata describing one or more of a location of the cart, an identification of the item, and a status of the smart cart system,
generating a message including the metadata and based on the request for help,
transmitting the message to a store computing system associated with the smart cart system, and
outputting, by the user interface device, a notification indicating that a store associate has been notified of the request for help.

15. The smart cart system of claim 1, further comprising:
the cart storage rack including the cart charging system, the cart charging system including a rail that interacts with the charging interface supported by the frame, the rail of the cart storage rack configured to simultaneously charge the cart and the one or more second carts when in the storage position and interacting with the cart storage rack.

16. A smart cart system comprising:
a smart cart including:
a basket supported by one or more support housings, a hinge mechanism coupling the basket with the one or more support housings, the basket configured to transition to a storage position, the storage position being configured to reduce storage space consumed by multiple smart carts when the multiple smart carts are in storage, transitioning the basket into the storage position including pivoting the basket using the hinge mechanism to allow the basket to nest with a second basket of a second smart cart,
one or more motors coupled with the one or more support housings, the one or more motors configured to provide motive force to the smart cart,
a user interface device coupled with the one or more support housings,
a computing device coupled with the user interface device and the one or more motors, and
a battery coupled with the computing device and the one or more motors;
a charging support member coupled with the one or more support housings, the charging support member including a charging interface that interacts with a rail of a cart storage rack to charge the battery of the smart cart and the second smart cart when the basket is nested with the second basket of the second smart cart; and
a smart cart controller operable on the computing device and configured to perform operations including instructing the smart cart to autonomously navigate within an operating environment.

17. A method comprising:
receiving, by a smart cart controller, information describing an attribute of an item;
providing, by the smart cart controller, the information describing the attribute of the item for presentation by a user interface device communicatively coupled with the smart cart controller;
determining, by the smart cart controller, a location of the item in an operating environment associated with smart cart system;
determining, by the smart cart controller, a current location of a cart in the operating environment;
navigating, by the smart cart controller, the cart to the location of the item using a determined path between the current location of the cart and the location of the item in the operating environment, a motivator providing motive force to the cart, and a guidance system communicatively coupled with the smart cart controller; and
nesting a first basket of the cart with one or more second baskets of one or more second carts in a storage position and, when in the storage position, charging a battery of the cart using a rack configured to charge the cart and the one or more second carts.

18. The method of claim 17, comprising:

identifying a location of a user in the operating environment using an optical sensor coupled with the smart cart controller; and instructing the motivator to provide the motive force to the cart to follow the user as the user moves within the operating environment using the location of the user.

19. The method of claim 17, wherein:

the smart cart controller is communicatively coupled with a scanner, and the method includes receiving, by the smart cart controller, scan data from the scanner and identifying the item based on the scan data.

20. The method of claim 19, comprising:

capturing, by the smart cart controller, the scan data including one or more of a bar code, a QR (quick response) code, and an image of the item using the scanner, transmitting, by the smart cart controller, the captured scan data to a server and, in response, receiving the information describing the attribute of the item from the server, and providing, by the smart cart controller, a graphical interface including a virtual shopping cart on the user interface device, the virtual shopping cart displaying the information describing the attribute of the item.

\* \* \* \* \*